(12) United States Patent
Lee et al.

(10) Patent No.: US 12,313,842 B2
(45) Date of Patent: May 27, 2025

(54) SCANNER AND ELECTRONIC DEVICE HAVING SAME

(71) Applicant: LG ELECTRONICS INC., Seoul (KR)

(72) Inventors: Byounggoo Lee, Seoul (KR); Joodo Park, Seoul (KR); Jaeyong An, Seoul (KR); Sangcheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 627 days.

(21) Appl. No.: 17/755,062

(22) PCT Filed: Oct. 25, 2019

(86) PCT No.: PCT/KR2019/014216
§ 371 (c)(1),
(2) Date: Apr. 20, 2022

(87) PCT Pub. No.: WO2021/080059
PCT Pub. Date: Apr. 29, 2021

(65) Prior Publication Data
US 2022/0373787 A1    Nov. 24, 2022

(51) Int. Cl.
*G02B 26/08*    (2006.01)
*G02B 26/10*    (2006.01)

(52) U.S. Cl.
CPC ......... *G02B 26/10* (2013.01); *G02B 26/0816* (2013.01)

(58) Field of Classification Search
CPC .. G02B 26/10; G02B 26/0816; G02B 26/101; G02B 26/0841
See application file for complete search history.

(56) References Cited

U.S. PATENT DOCUMENTS 9,753,279 B2 * 9/2017 Vigna ................ G02B 26/0841

FOREIGN PATENT DOCUMENTS

| JP | 2004-264702 | 9/2004 |
|----|-------------|--------|
| JP | 2006-010715 | 1/2006 |
| JP | 2009-142048 | 6/2009 |

(Continued)

OTHER PUBLICATIONS

PCT International Application No. PCT/KR2019/014216, International Search Report dated Sep. 1, 2020, 4 pages.

(Continued)

*Primary Examiner* — Euncha P Cherry
(74) *Attorney, Agent, or Firm* — LEE, HONG, DEGERMAN, KANG & WAIMEY

(57) ABSTRACT

The present disclosure relates to a scanner and an electronic apparatus including the scanner. The scanner according to the present disclosure comprises a mirror, a substrate separated from the outside of the mirror, a first and a second mirror support member, a first and a second mirror spring, and a plurality of combs formed on the substrate and to supply a rotational force based on electrostatic force to the mirror, wherein the substrate includes a first edge and a second edge closer to the mirror than the first edge and placed at a lower position than the first edge, and the optical interference angle at the second edge is greater than the optical interference angle at the first edge. Accordingly, it is possible to output light in both directions of a mirror and thereby to perform wide-angle scanning.

18 Claims, 34 Drawing Sheets

(56) References Cited

FOREIGN PATENT DOCUMENTS

| | | |
|---|---|---|
| JP | 2009-265608 | 11/2009 |
| KR | 10-2006-0026001 | 3/2006 |
| KR | 10-2017-0142251 | 12/2017 |
| KR | 10-2020-0031027 | 3/2020 |

OTHER PUBLICATIONS

1 Korean Intellectual Property Office Application No. 10-2022-7005854, Office Action dated Jul. 29, 2024, 6 pages.

* cited by examiner

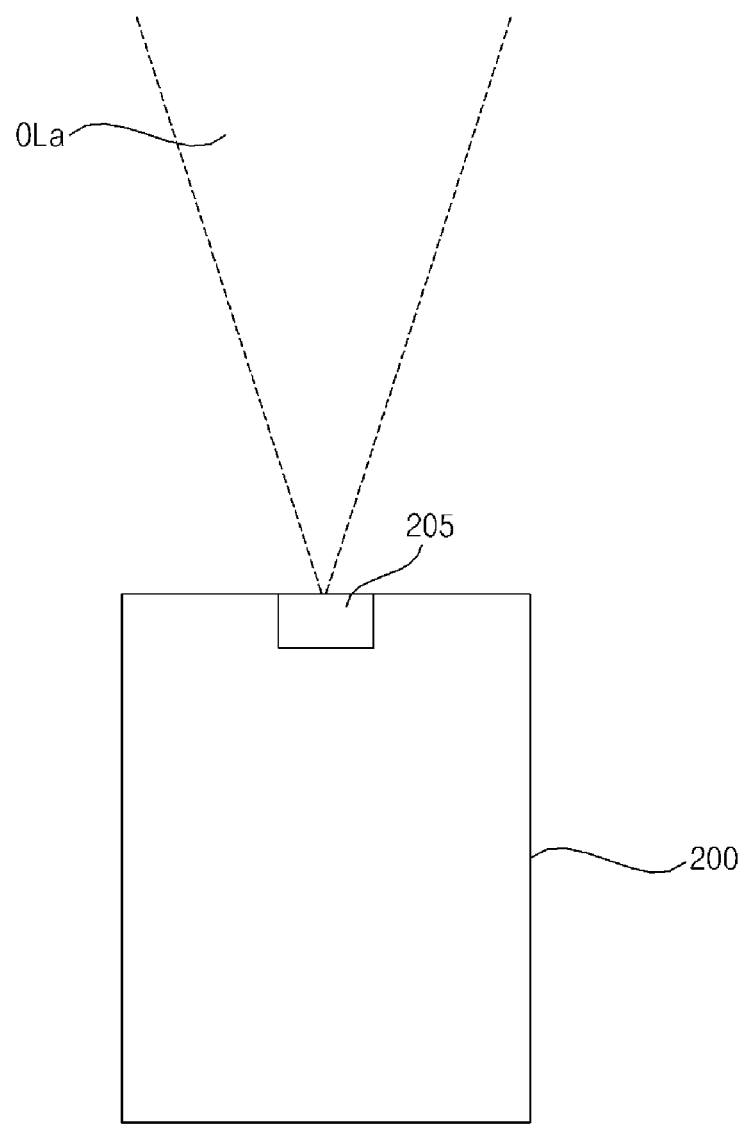

| w | σ max |
|---|---|
| 0.1 | 1.72 |
| 0.14 | 1.07 |
| 0.2 | 0.64 |
| 0.3 | 0.43 |
| 0.4 | 0.32 |

FIG. 7B

| Xa | σ max |
|---|---|
| 0.00 | 5.78 |
| 0.10 | 3.55 |
| 0.20 | 1.96 |
| 0.30 | 0.88 |
| 0.40 | 0.40 |
| 0.50 | 0.37 |

FIG. 8B

| w | σ max |
|---|---|
| 0.1 | 0.39 |
| 0 | 0.49 |
| -0.1 | 0.61 |
| -0.2 | 0.78 |
| -0.3 | 1.07 |
| -0.4 | 1.62 |

FIG. 9B

| ha | σ max |
|---|---|
| 0.5 | 0.61 |
| 0.4 | 0.63 |
| 0.3 | 0.84 |
| 0.2 | 1.22 |
| 0.1 | 2.00 |

FIG. 10B

| wa | σ max |
|---|---|
| 0.89 | 0.63 |
| 0.8 | 0.70 |
| 0.7 | 0.85 |
| 0.6 | 1.10 |
| 0.5 | 1.51 |
| 0.45 | 1.74 |

FIG. 11
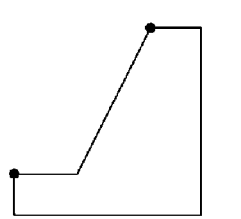
(a)
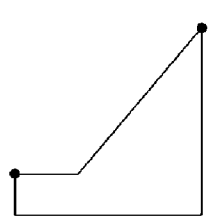
(b)
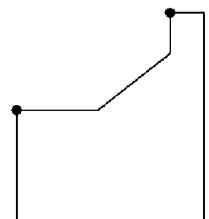
(c)
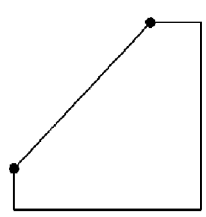
(d)
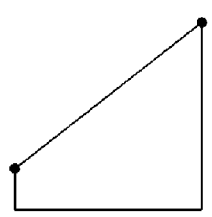
(e)
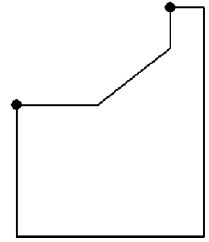
(f)
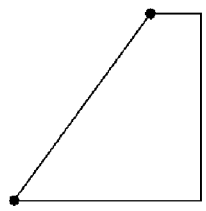
(g)
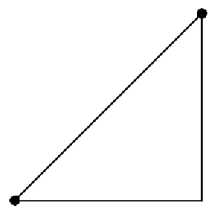
(h)
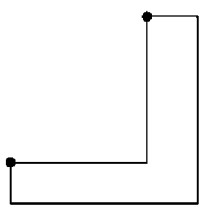
(i)

FIG. 12C
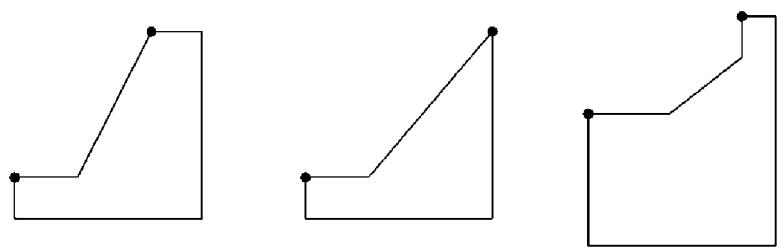
(a)    (b)    (c)
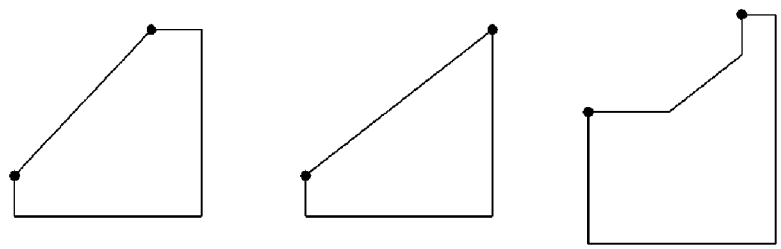
(d)    (e)    (f)
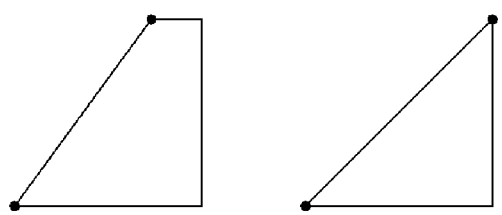
(g)    (h)

SCANNER AND ELECTRONIC DEVICE HAVING SAME

CROSS-REFERENCE TO RELATED APPLICATIONS

This application is the National Stage filing under 35 U.S.C. 371 of International Application No. PCT/KR2019/014216, filed on Oct. 25, 2019, the contents of which is hereby incorporated by reference herein in its entirety.

BACKGROUND OF THE DISCLOSURE

1. Field of the Disclosure

The present disclosure relates to a scanner and an electronic apparatus including the same and more particularly, to a scanner capable of performing wide-angle scanning and an electronic apparatus including the same.

2. Description of the Related Art

Optical-based MEMS scanners are being developed for projector-based displays. Recently, optical-based MEMS scanners have been employed for lidars used for robots, drones, driving assistance for vehicles, or user detection for home appliances.

Research on the MEMS scanner's lowest frequency, driving angle, mirror size, and so on is being conducted to ensure the reliability of driving assistance or user detection based on the MEMS scanner.

SUMMARY

An object of the present disclosure is to provide a scanner capable of performing wide-angle scanning and an electronic apparatus including the scanner.

Another object of the present disclosure is to provide a scanner capable of reducing element size while reducing optical interference and an electronic apparatus including the scanner.

Yet another object of the present disclosure is to provide a scanner with improved horizontal and vertical resolutions and beam reflection performance and an electronic apparatus including the scanner.

To achieve the objects above, a scanner according to an embodiment of the present disclosure and an electronic apparatus including the scanner comprises a mirror to rotate around a first axis based on a direct drive mechanism; a substrate separated from the outside of the mirror; a first and a second mirror support member connected respectively to a first side and a second side of the mirror; a first and a second mirror spring connected respectively to the first and second mirror support members; and a plurality of combs formed on the substrate and to supply a rotational force based on electrostatic force to the mirror, wherein the substrate includes a first edge and a second edge closer to the mirror than the first edge and placed at a lower position than the first edge; and the optical interference angle at the second edge is greater than the optical interference angle at the first edge.

Meanwhile, a step is formed at the first edge with respect to the upper surface of the mirror.

Meanwhile, it is preferable that in response to the mirror rotating around the first axis, the magnitude of the rotation angle relative to the second axis intersecting the first axis is 40 degrees, and in response to the radius of the mirror being R, the distance between the center of the mirror and the first edge is smaller than 4.41R.

Meanwhile, the first and second edges are connected with a partial slope, with a full slope, or at the right angle.

Meanwhile, in response to the mirror rotating around the first axis, the magnitude of the rotation angle relative to the second axis may be 25 to 40 degrees.

Meanwhile, a step may be formed at the first edge with respect to the upper surface of the mirror, and in response to the magnitude of the rotation angle relative to the second axis being $\theta$, the thickness of the mirror being H, the radius of the mirror being R, and the mirror rotating around the first axis, the height of the step formed at the first edge may correspond to $R\times\sin(\theta)+H\times\cos(\theta)$.

Meanwhile, a step may be formed at the first edge with respect to the upper surface of the mirror, and in response to the thickness of the mirror being H, the radius of the mirror being R, and the mirror rotating around the first axis, the height of the step formed at the first edge may be $0.42R+0.9H$ to $0.64R+0.76H$.

Meanwhile, in the plane formed by the first axis and a third axis orthogonal to the first and second axes, light may be incident on the mirror along the third axis or at a predetermined angle relative to the third axis, and the light may be reflected in a direction related to a first area and a second area.

To achieve the objects above, a scanner according to another embodiment of the present disclosure and an electronic apparatus including the scanner comprises a mirror to rotate around a first axis based on a direct drive mechanism; an upper substrate separated from the outside of the mirror; a first and a second mirror support member connected respectively to a first side and a second side of the mirror; a first and a second mirror spring connected respectively to the first and second mirror support members; a plurality of combs formed on the upper substrate and to supply a rotational force based on electrostatic force to the mirror; and a lower substrate disposed in the lower part of the upper substrate, wherein the upper substrate includes a first edge and a second edge closer to the mirror than the first edge and placed at a lower position than the first edge; and the optical interference angle at the second edge is greater than the optical interference angle at the first edge.

Meanwhile, in response to the mirror rotating around the first axis, the magnitude of the rotation angle relative to the second axis intersecting the first axis is 40 degrees, and in response to the radius of the mirror being R, the distance between the center of the mirror and the first edge is smaller than 4.41R.

Meanwhile, the first and second edges are connected with a partial slope, with a full slope, or at the right angle.

Meanwhile, in response to the mirror rotating around the first axis, the magnitude of the rotation angle relative to the second axis may be 25 to 40 degrees.

Meanwhile, a step may be formed at the first edge with respect to the upper surface of the mirror, and in response to the magnitude of the rotation angle relative to the second axis being, the mirror rotating around the first axis, the thickness of the mirror being H, and the radius of the mirror being R, the height of the step formed at the first edge may correspond to $R\times\sin(\theta)+H\times\cos(\theta)$.

Meanwhile, a step may be formed at the first edge with respect to the upper surface of the mirror, and in response to the thickness of the mirror being H, the radius of the mirror being R, and the mirror rotating around the first axis, the height of the step formed at the first edge may be 0.42R+0.9H to 0.64R+0.76H.

Meanwhile, in the plane formed by the first axis and a third axis orthogonal to the first and second axes, light may be incident on the mirror along the third axis or at a predetermined angle relative to the third axis, and the light may be reflected in a direction related to a first area and a second area.

Effects of the Disclosure

A scanner according to an embodiment of the present disclosure and an electronic apparatus including the scanner comprises a mirror to rotate around a first axis based on a direct drive mechanism; a substrate separated from the outside of the mirror; a first and a second mirror support member connected respectively to a first side and a second side of the mirror; a first and a second mirror spring connected respectively to the first and second mirror support members; and a plurality of combs formed on the substrate and to supply a rotational force based on electrostatic force to the mirror, wherein the substrate includes a first edge and a second edge closer to the mirror than the first edge and placed at a lower position than the first edge; and the optical interference angle at the second edge is greater than the optical interference angle at the first edge. Accordingly, it is possible to perform wide-angle scanning. Also, it is possible to reduce the element size while reducing optical interference.

Meanwhile, a step is formed at the first edge with respect to the upper surface of the mirror. Accordingly, it is possible to reduce optical interference and element size while performing wide-angle scanning.

Meanwhile, in response to the mirror rotating around the first axis, the magnitude of the rotation angle relative to the second axis intersecting the first axis is 40 degrees, and in response to the radius of the mirror being R, the distance between the center of the mirror and the first edge is smaller than 4.41R. Accordingly, it is possible to reduce optical interference and element size while performing wide-angle scanning.

Meanwhile, the first and second edges are connected with a partial slope, with a full slope, or at the right angle. Accordingly, various shapes may be implemented through etching.

Meanwhile, in response to the mirror rotating around the first axis, the magnitude of the rotation angle relative to the second axis may be 25 to 40 degrees. Accordingly, it is possible to perform wide-angle scanning.

Meanwhile, a step may be formed at the first edge with respect to the upper surface of the mirror, and in response to the magnitude of the rotation angle relative to the second axis being θ, the thickness of the mirror being H, the radius of the mirror being R, and the mirror rotating around the first axis, the height of the step formed at the first edge may correspond to $R \times \sin(\theta) + H \times \cos(\theta)$. Accordingly, it is possible to prevent collision with the substrate due to the rotation of the mirror. Also, it is possible to perform wide-angle scanning.

Meanwhile, in response to the thickness of the mirror being H, the radius of the mirror being R, and the mirror rotating around the first axis, the height of the step formed at the first edge may be 0.42R+0.9H to 0.64R+0.76H. Accordingly, it is possible to prevent collision with the substrate due to the rotation of the mirror. Also, it is possible to perform wide-angle scanning.

Meanwhile, in the plane formed by the first axis and a third axis orthogonal to the first and second axes, light may be incident on the mirror along the third axis or at a predetermined angle relative to the third axis, and the light may be reflected in a direction related to a first area and a second area. Accordingly, it is possible to perform wide-angle scanning for a normal incidence scheme.

A scanner according to another embodiment of the present disclosure and an electronic apparatus including the scanner comprises a mirror to rotate around a first axis based on a direct drive mechanism; an upper substrate separated from the outside of the mirror; a first and second mirror support members connected respectively to a first side and a second side of the mirror; a first and second mirror springs connected respectively to the first and second mirror support members; a plurality of combs formed on the upper substrate and to supply a rotational force based on electrostatic force to the mirror; and a lower substrate disposed in the lower part of the upper substrate, wherein the upper substrate includes a first edge and a second edge closer to the mirror than the first edge and placed at a lower position than the first edge; and the optical interference angle at the second edge is greater than the optical interference angle at the first edge. Accordingly, light may be emitted in both side directions of the mirror, and thus, it is possible to perform wide-angle scanning. Also, it is possible to reduce the element size while reducing optical interference.

Meanwhile, a step is formed at the first edge with respect to the upper surface of the mirror. Accordingly, it is possible to reduce optical interference and element size while performing wide-angle scanning.

Meanwhile, in response to the mirror rotating around the first axis, the magnitude of the rotation angle relative to the second axis intersecting the first axis is 40 degrees, and in response to the radius of the mirror being R, the distance between the center of the mirror and the first edge is smaller than 4.41R. Accordingly, it is possible to reduce optical interference and element size while performing wide-angle scanning.

Meanwhile, the first and second edges are connected with a partial slope, with a full slope, or at the right angle. Accordingly, various shapes may be implemented through etching.

Meanwhile, in response to the mirror rotating around the first axis, the magnitude of the rotation angle relative to the second axis may be 25 to 40 degrees. Accordingly, it is possible to perform wide-angle scanning.

Meanwhile, a step may be formed at the first edge with respect to the upper surface of the mirror, and in response to the magnitude of the rotation angle relative to the second axis being, the mirror rotating around the first axis, the thickness of the mirror being H, and the radius of the mirror being R, the height of the step formed at the first edge may correspond to $R \times \sin(\theta) + H \times \cos(\theta)$. Accordingly, it is possible to prevent collision with the substrate due to the rotation of the mirror. Also, it is possible to perform wide-angle scanning.

Meanwhile, a step may be formed at the first edge with respect to the upper surface of the mirror, and in response to the thickness of the mirror being H, the radius of the mirror being R, and the mirror rotating around the first axis, the height of the step formed at the first edge may be 0.42R+0.9H to 0.64R+0.76H. Accordingly, it is possible to prevent collision with the substrate due to the rotation of the mirror. Also, it is possible to perform wide-angle scanning.

Meanwhile, a step may be formed only in the upper substrate, and the step prevents collision with the lower substrate due to the rotation of the mirror.

Meanwhile, in the plane formed by the first axis and a third axis orthogonal to the first and second axes, light may be incident on the mirror along the third axis or at a predetermined angle relative to the third axis, and the light may be reflected in a direction related to a first area and a second area. Accordingly, it is possible to perform wide-angle scanning for a normal incidence scheme.

BRIEF DESCRIPTION OF THE DRAWINGS

FIG. 1 illustrates an electronic apparatus including a scanner according to one embodiment of the present disclosure;

FIGS. 6B to 6C are drawings referenced for description of FIG. 6A;

FIGS. 7A to 7C are drawings referenced for description of FIG. 3A;

FIGS. 8B to 8C are drawings referenced for description of FIG. 8A;

FIGS. 9B to 9C are drawings referenced for description of FIG. 9A;

FIGS. 10B to 10C are drawings referenced for description of FIG. 8A;

FIGS. 11 to 12C illustrate scanners according to various embodiments of the present disclosure.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Electronic apparatuses according to the present disclosure may include robots, drones, and vehicles that may employ lidars for navigation purposes and may further include home appliances such as refrigerators, washing machines, air conditioners, electronic doors, and automatic temperature control devices providing user detection features.

Meanwhile, a scanner according to the present disclosure is a scanner employed in a lidar sensor and outputs light to the front.

FIG. 1 illustrates an electronic apparatus including a scanner according to one embodiment of the present disclosure.

Referring to the figure, the electronic apparatus 200 may have an optical output device 205 to output light to the front. Meanwhile, the optical output device 205 may be implemented using a scanner.

Meanwhile, the optical output device 205 may be equipped with a scanner according to one embodiment of the present disclosure.

For example, the scanner in the optical output device 205 may output scanning light OLa to the front approximately from several meters to several hundreds of meters ahead.

Meanwhile, the light output from the optical output device 205 is infrared light, the wavelength of which may range approximately from 900 to 1550 nm.

Figure 2A:
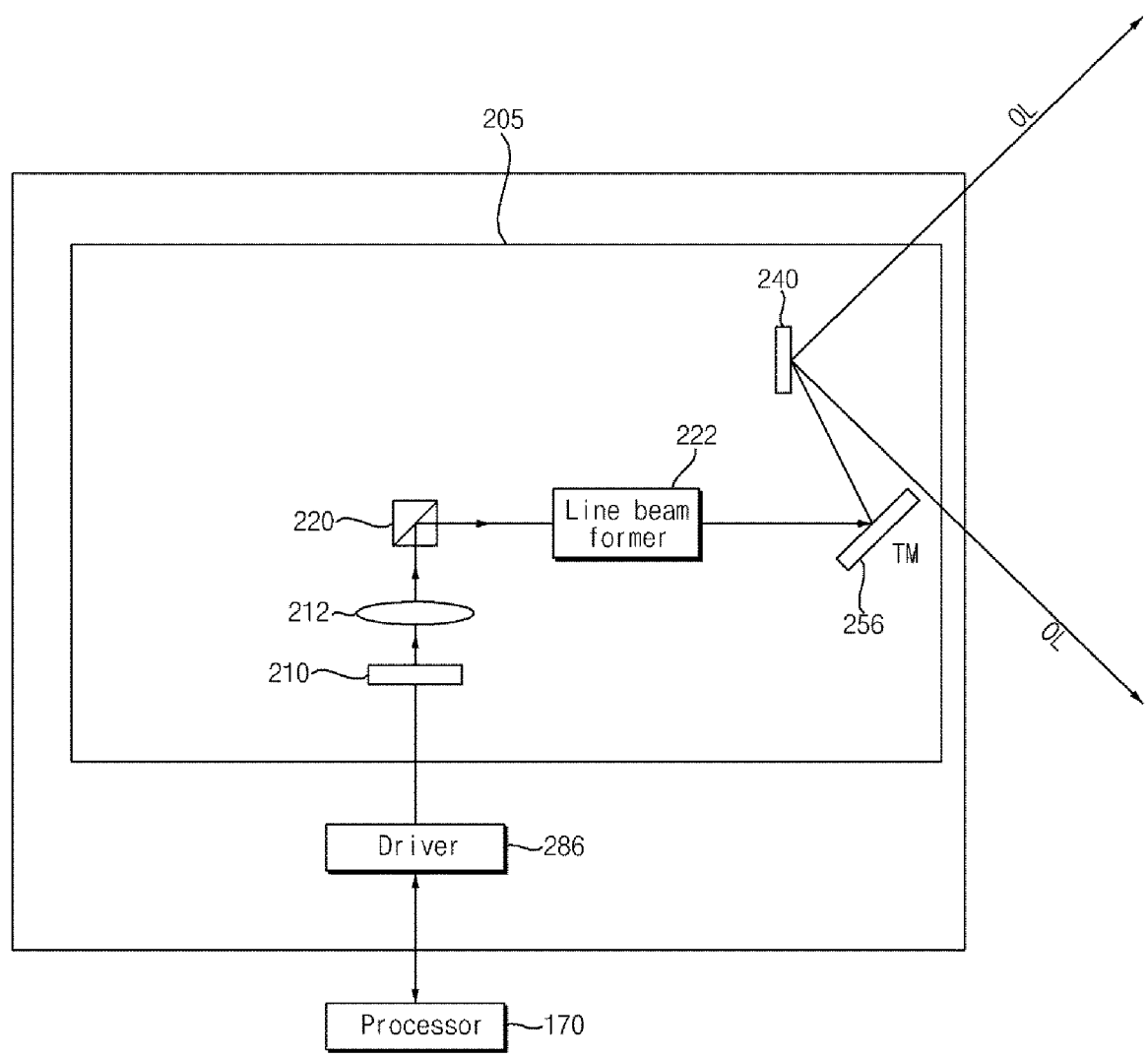
FIG. 2A illustrates an internal block diagram of an optical output device including a scanner according to one embodiment of the present disclosure.

FIG. 2A illustrates an internal block diagram of an optical output device including a scanner according to one embodiment of the present disclosure.

Referring to the drawing, the optical output device 205 may output scanning light to the outside of the electronic apparatus.

The optical output device 205 preferably uses, as a light source, a laser diode having good straightness to output scanning light OL to the front ranging approximately from several meters to several hundreds of meters.

Meanwhile, the optical output device 205 includes a light source 210 that outputs infrared light and a driver 286 that drives the light source 210.

For example, the light source 210 may output infrared light having a wavelength ranging from approximately 900 to 1550 nm.

Meanwhile, the light source 210 may be driven by an electrical signal from the driver 286, and the electrical signal of the driver 286 may be generated under the control of the processor 170.

Infrared light output from the light source 210 is collimated through each collimator lens within the light collector 212.

The light reflector 220 reflects the infrared light output from the light source 210 or the light collector 212 and outputs the infrared light, the propagation path of which has been changed, in one direction. To this end, the light reflector 220 may include a 1-D MEMS mirror.

For example, the light reflector 220 reflects the infrared light output from the light source 210 or the light collector 212 to output the infrared light, the propagation path of which has been changed, toward the scanner module 240.

Meanwhile, the line beam former 222 may form the light from the light reflector 220 into a line beam. To this end, when the light reflector 220 is implemented using a 1D MEMS mirror, the line beam former 222 may be excluded.

In particular, the line beam former 222 may form and output a straight line beam by considering the scanner module 240 capable of performing only unidirectional scanning.

Next, the light reflector 256 may reflect the line beam from the line beam former 222 toward the scanner module 240. To this end, the light reflector 256 may be implemented using a total mirror (TM).

Meanwhile, the scanner module 240 may cause the line beam reflected by the light reflector 256 to scan in a first direction.

In other words, the scanner module 240 may sequentially and repeatedly perform scanning of an input line beam in the first direction. Accordingly, scanning light OL corresponding to the infrared light may be output to the outside.

Figure 2B:
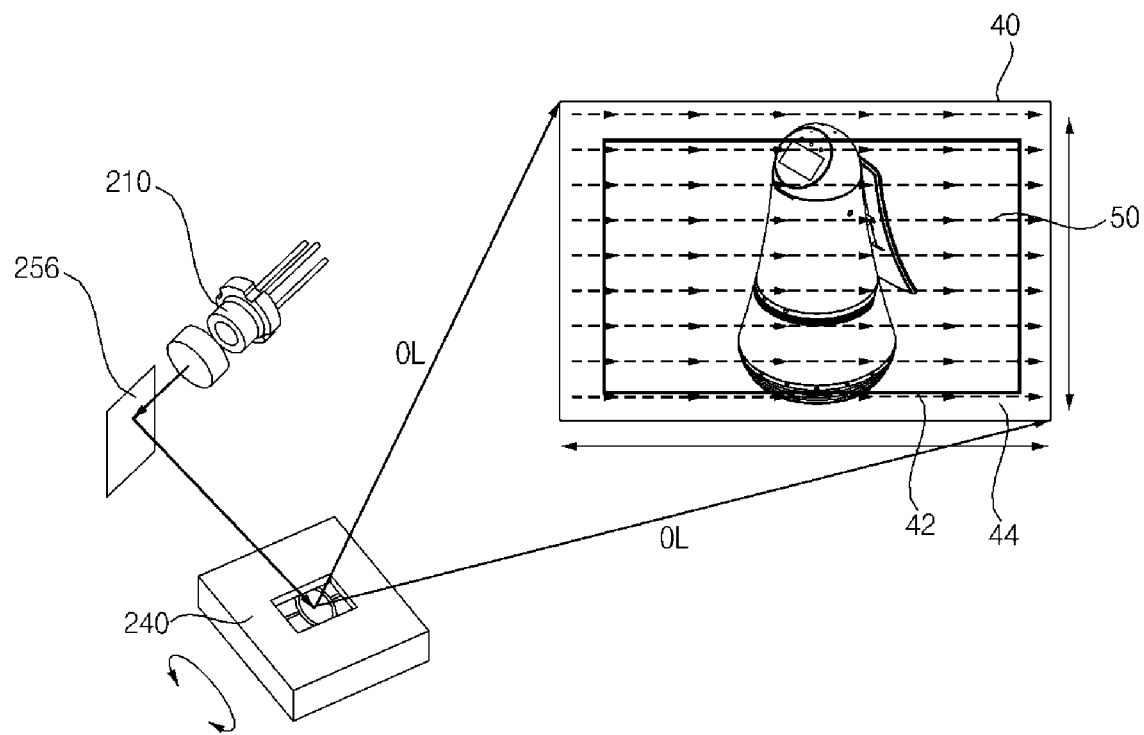
FIG. 2B illustrates a scanning method when the scanner module of FIG. 2A projects light.

FIG. 2B illustrates a scanning method when the scanner module of FIG. 2A projects light.

Referring to the figure, the light from the light source 210 passes through the light reflector 220, the line beam former 222, and the light reflector 256 and is input to the scanner module 240. The scanner module 240 may sequentially and repeatedly perform scanning in the first direction with respect to the input light or line beam.

As shown in the figure, the scanner module 240 may perform scanning from left to right in the first direction, namely, an oblique direction or horizontal direction with respect to the outer area 40 primarily for a scannable area. Also, the scanning operation may be repeatedly performed for the entire outer region 40.

The scanning operation makes it possible to output the infrared scanning light to the outside.

Meanwhile, the outer area 40 may be divided into a first area 42 and a second area 44 as shown in FIG. 2B. Here, the first area 42 may be an area including the external object 43, that is, an active area 42, and the second area 44 may be an area that does not include the external object 43, that is, a blank area 44.

Accordingly, the entire scanning section may also be divided into a first scanning section corresponding to the active area 42 in which an external object exists and a second scanning section corresponding to the blank area 44 in which no external object exists.

Figure 2C:
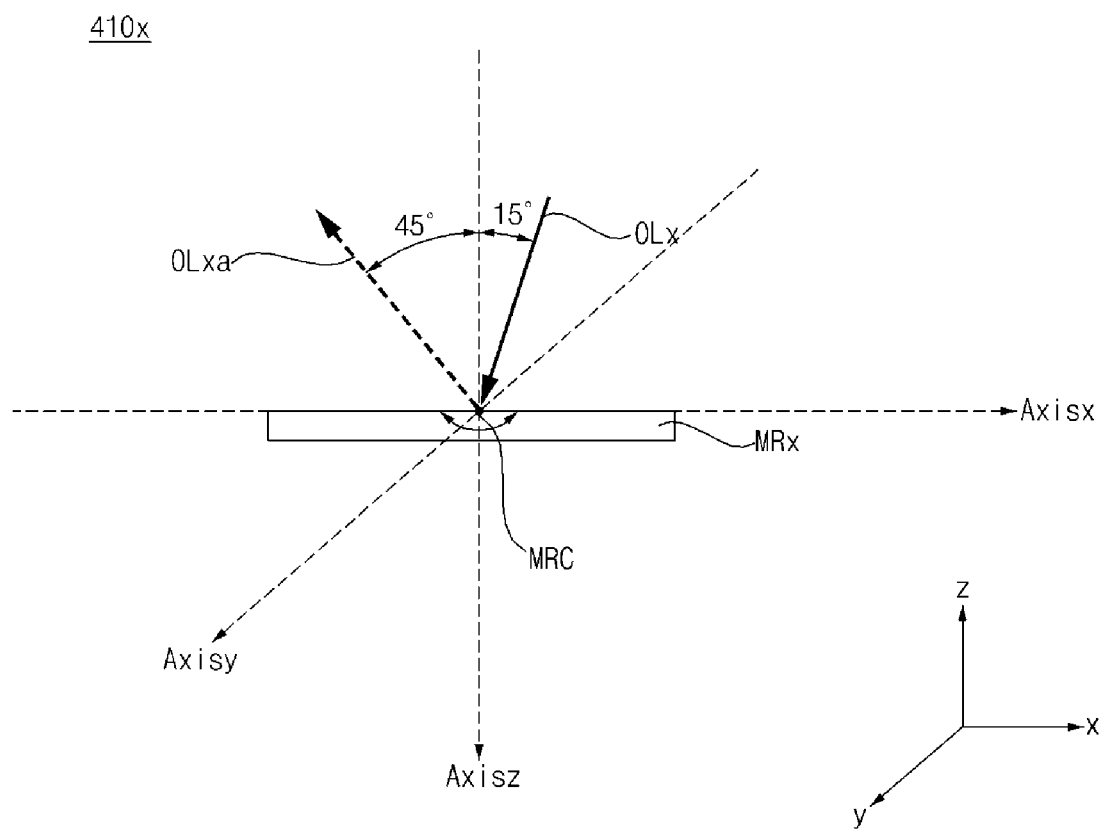
FIG. 2C illustrates the operation of a scanner based on the conventional horizontal incidence method.

FIG. 2C illustrates the operation of a scanner based on the conventional horizontal incidence method.

The conventional horizontal incidence method was applied to a scanner 410x having an optical angle of 60 degrees or less due to the breakage limit of a silicon-based mirror spring under the large-diameter mirror, high driving frequency, and wide driving angle conditions.

Referring to the figure, the horizontal incidence scheme is a scheme in which light is incident at a predetermined angle relative to a third axis Axisz on the plane formed by a second axis Axisx and a third axis Axisz.

Meanwhile, the scanner 410x having an optical angle of 60 degrees according to the conventional horizontal incidence method may have a mirror that reflects the incoming light OLx incident at an angle of at least 15 degrees relative to the third axis Axisz uni-directionally with respect to the incident light to avoid optical interference with the light source using the rotation of the mirror.

Accordingly, the incident light OLx incident from the right at an angle of 15 degrees relative to the third axis Axisz is emitted as the reflected light OLxa to the left of the incident light in response to the mirror MRx rotating 15 degrees to the left and right around the center MRC of the mirror.

In the figure, it is assumed that the optical angle of the mirror MRx is 60 degrees, which is the sum of 15 degrees on the right side and 45 degrees on the left side with respect to the third axis Axisz.

In other words, according to a scanner 410x having an optical angle of 60 degrees based on the conventional horizontal incidence method of FIG. 2C, it is necessary to ensure a minimum incident angle to avoid optical interference between incident light and scanning reflected light.

Also, as the optical angle of the scanner becomes large, a larger horizontal incident angle has to be employed. However, as the horizontal incident angle and the rotation angle of the mirror increase, the active area of the mirror decreases from the viewpoint of the incident light, and the optical efficiency decreases, which is not preferable for wide-angle applications.

Accordingly, to implement a wide-angle scanner, the present disclosure uses a normal incidence method instead of the horizontal incidence method.

The normal incidence method is a method in which light is incident along the third axis Axisz or at a predetermined angle relative to the third axis Axisz on the plane formed by the first axis Axisy and the third axis Axisz. Accordingly, it is possible to realize wide-angle scanning without optical interference between incident light and reflected light.

According to the normal incidence method, light is incident toward the mirror along or in the vicinity of the third axis Axisz, and reflected light is output in both left and right directions with respect to the center MRC of the mirror. In particular, reflected light may be output symmetrically in both left and right directions. When light is output symmetrically, it is possible to configure an optical system without optical interference of incident light along the third axis Axisz by using a transflective mirror and the like. The above configuration will be described with reference to FIG. 3A.

Figure 3A:
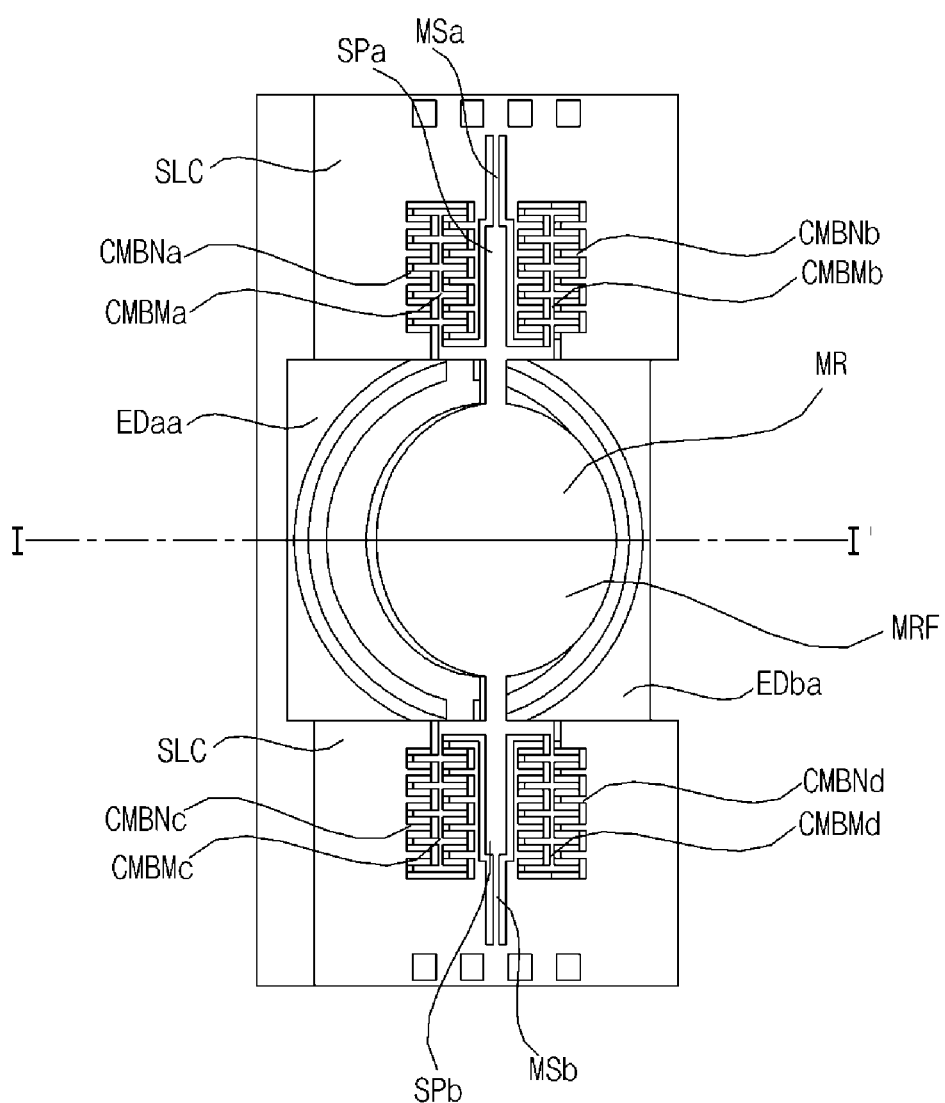
FIG. 3A illustrates a scanner according to an embodiment of the present disclosure.

FIG. 3A illustrates a scanner according to an embodiment of the present disclosure, and FIGS. 3B to 4D are drawings referenced for description of FIG. 3A. The figures show a scanner according to an embodiment of the present disclosure.

Figure 3B:
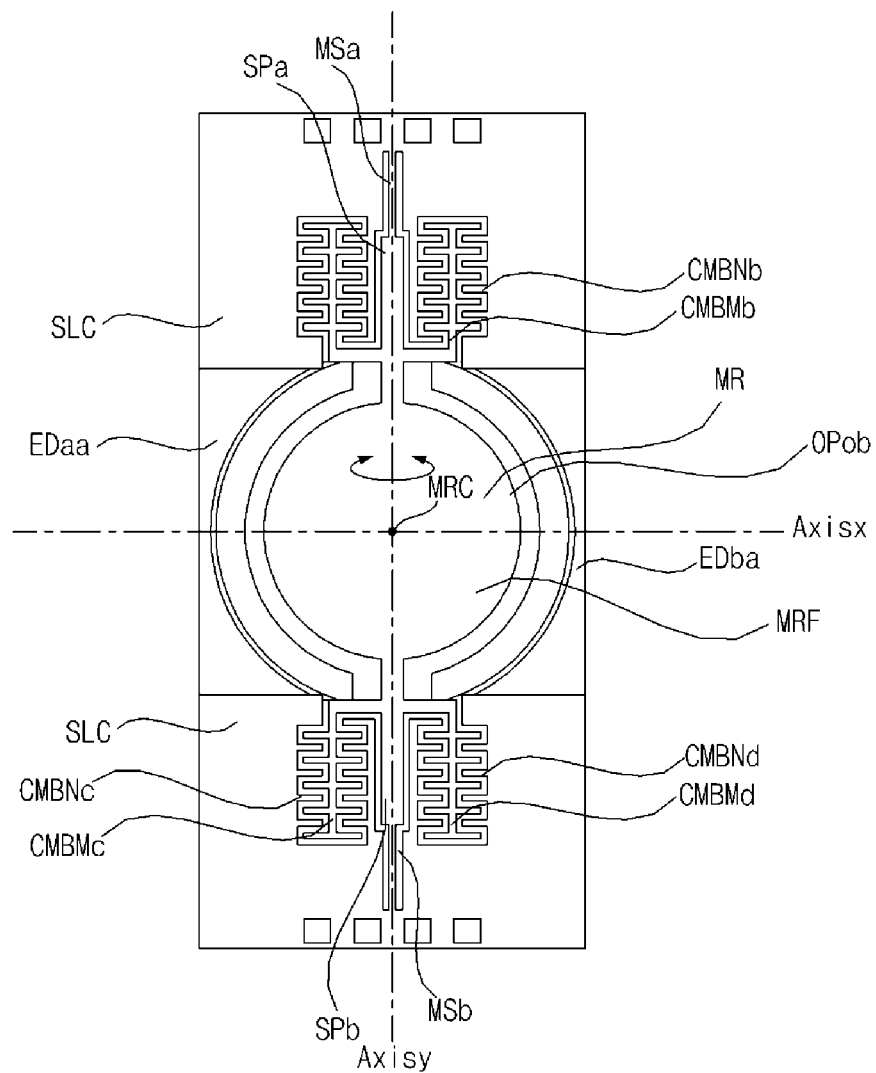
FIGS. 3B to 4D are drawings referenced for description of FIG. 3A.
Figure 3C:
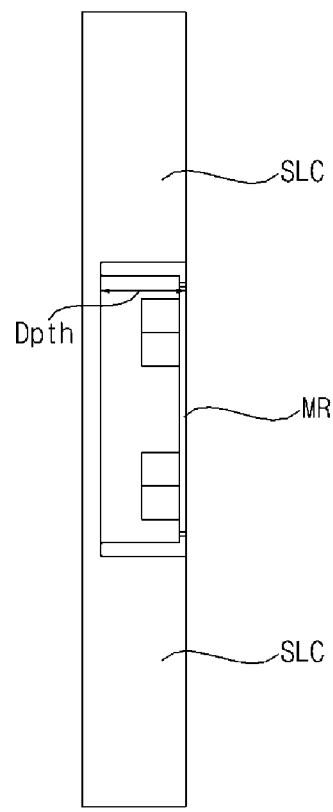

Referring to the figure, FIG. 3A shows a perspective view of a scanner according to an embodiment of the present disclosure, FIG. 3B shows a front view of a scanner according to an embodiment of the present disclosure, and FIG. 3C shows a side view of a scanner according to an embodiment of the present disclosure.

Referring to the figure, the scanner 410 according to an embodiment of the present disclosure may be a scanner based on the electrostatic force-based direct drive mechanism.

To this purpose, the scanner 410 includes a mirror MR rotating about a first axis Axisy based on the direct drive mechanism; a first and a second mirror supporting member SPa, SPb connected respectively to a first and a second side of the mirror MR; a first and a second mirror spring MSa, MSb connected respectively to the first and second mirror supporting members SPa, SPb; a plurality of combs CMBMa to CMBMd, CMBNa to CMBNd supplying a rotational force based on electrostatic force to the mirror MR; and a substrate SLC separated from the outside of the mirror.

The substrate SLC may be placed apart from the mirror MR and formed in a rectangular shape on the outside around the mirror MR.

Among the plurality of combs, the first comb CMBMa to CMBMd may be movable and, by being connected to the first or second mirror supporting member SPa or SPb, transfer a rotational force based on electrostatic force to the mirror MR.

Meanwhile, among the plurality of combs, the second comb CMBNa to CMBNd may be a fixed-type comb formed on the substrate SLC and disposed in correspondence with the first comb CMBMa to CMBMd.

A rotational force is generated by the electrostatic force between the first comb CMBMa to CMBMd and the second comb CMBNa to CMBNd, and the generated rotational force may be transferred to the mirror MR.

Meanwhile, the figure assumes that, along the first axis direction Axisy, the first and second mirror support members SPa and SPb are connected to the first side and the second side of the mirror MR, and the first and second mirror springs MSa and MSb are connected respectively to the first and second mirror supporting members SPa and SPb; however, it should be noted that various modifications of the above configuration are possible.

For example, the scanner 410 may further include a third and a fourth mirror spring (not shown) connected to the first and second mirror supporting members SPa and SPb and to extend symmetrically in the second axial direction. Accordingly, the stress exerted on the first and second mirror springs MSa and MSb may be reduced by the third and fourth mirror springs (not shown).

Meanwhile, steps EDba and EDaa may be formed in the first and second areas, which occupy a portion of the substrate SLC and which form both areas of the mirror MR.

Here, the first and second areas, which form both areas, may mean both side areas of the mirror MR; however, the first and second areas are not limited thereto and may include space under the mirror MR. In other words, the step may be formed in both side areas of the mirror MR as well as both side areas under the mirror MR.

Accordingly, light may be output in both directions of the mirror MR, thus enabling wide-angle scanning without optical interference due to the substrate.

Meanwhile, the steps EDba and EDa formed in the first and second areas may have an asymmetric shape. For example, the upper area of the steps EDba and EDaa may be larger than the lower area. Accordingly, wide-angle scanning is made possible in response to the incident angle being increased in the normal incidence method.

Meanwhile, the width of the substrate SLC may be greater than or equal to the diameter of the mirror MR. Accordingly, it is possible to prevent damage to the mirror, which may occur while the substrate SLC is handled.

Meanwhile, in the plane formed by the first axis Axisy and the third axis Axisz orthogonal to the first axis Axisy and the second axis Axisx, light may be incident along the third axis Axisz or at a predetermined angle relative to the third axis Axisz, and light may be reflected in a direction corresponding to the first area and the second area. Accordingly, wide-angle scanning is made possible in the normal incidence method.

Meanwhile, a first pattern and a second pattern formed through etching may be further included on the rear surface of the mirror MR. Accordingly, the driving force for the scanner may be reduced by reducing the Moment Of Inertia (MOI) of the mirror while maintaining the rigidity of the mirror. Accordingly, through the scanner 410, horizontal and vertical resolutions and beam reflection performance may be improved.

Meanwhile, the first pattern and the second pattern may have an arc shape separated from the circumference of the mirror MR. Accordingly, through the scanner 410, horizontal and vertical resolutions and beam reflection performance may be improved.

Meanwhile, the present disclosure proposes a scanner capable of performing wide-angle scanning among scanners that may be employed for various electronic apparatuses.

Meanwhile, as shown in FIG. 2C, the optical angle of the mirror MRx in the conventional horizontal incidence type scanner 410x was 60 degrees or less.

Meanwhile, in response to the optical angle of the mirror MRx being designed to be 60 degrees or more to realize a large-diameter mirror, a high driving frequency, and a wide driving angle for the horizontal incident method, the angle of the incident light has to be increased further with respect to the third axis Axisz to avoid optical interference.

At this time, as the angle of the incident light relative to the third axis Axisz increases and the rotation angle of the mirror increases, the effective area of the mirror decreases from the viewpoint of the incident light, and thus optical efficiency is degraded. Also, as the rotation angle of the mirror MRx increases, a problem occurs that the silicon-based mirror spring is easily damaged.

However, the present disclosure designs a scanner 410 having a high driving frequency and a wide driving angle while reducing the possibility of damaging silicon-based mirror springs.

In particular, according to the normal incidence method, along or in the vicinity of the third axis Axisz, light is incident toward the mirror, and reflected light is output in both left and right directions with respect to the center MRC of the mirror. In particular, reflected light is output symmetrically in both left and right directions.

Accordingly, in the present disclosure, light is incident on the mirror MR along the third axis Axisz or at a predetermined angle relative to the third axis Axisz in the plane formed by the first axis Axisy and the third axis Axisz.

The normal incidence method employs the above mechanism and provides an advantage that it is suitable for realizing wide-angle scanning without involving optical interference of incident light compared to the horizontal incidence method of FIG. 2C.

Meanwhile, according to the rotation of the mirror MR of the scanner 410, the angle of reflected light is changed, and the present disclosure sets the angle of light reflected to the left of the incident light to be at least 45 degrees and the angle of light reflected to the right of the incident light to be at least 45 degrees.

In other words, according to the embodiment of the present disclosure, it is preferable to set the optical angle of the mirror MR of the scanner 410 to be at least 90 degrees.

The above setting is related to outputting the reflected light OLxa at 45 degrees to the left of the vertical axis Axisz of FIG. 2C.

Accordingly, according to the embodiment of the present disclosure, the minimum optical angle in the normal incidence method corresponds to the path of the reflected light at 45 degrees to the left of FIG. 2C. Accordingly, a path of reflected light greater than 45 degrees to the left of FIG. 2C is set for a wide-angle scanner.

Meanwhile, when the optical angle of the mirror MR of the scanner 410 is less than 90 degrees, the rotation angle of the mirror MR becomes smaller, which prevents wide-angle scanning.

Meanwhile, when the optical angle of the mirror MR is 90 degrees, the final optical angle of the mirror MR is preferably 100 degrees in consideration of the optical angle margin of 10 degrees. Accordingly, the present disclosure proposes a scanner 410 in which the final optical angle of the mirror MR is 100 degrees.

In other words, considering that the magnitude of the rotation angle relative to the second axis Axisx is 22.5 degrees or more and the driving angle margin is 2.5 degrees in response to the mirror MR rotating around the first axis Axisy, the present disclosure proposes a scanner 410 in which the final rotation angle relative to the second axis Axisx is 25 degrees or more. Accordingly, the final optical angle of the mirror MR is preferably 100 degrees or more.

Meanwhile, as the final optical angle of the mirror MR increases, an optical loss may occur due to the substrate disposed on the reflected light path, or the size of the scanner increases as the substrate is arranged being separated.

Meanwhile, an electronic apparatus employing LiDAR uses a wide-angle camera to obtain more image information; for example, a wide-angle camera having a maximum viewing angle of approximately 150 degrees is used. Therefore, according to the present disclosure, it is preferable that the maximum optical angle of the mirror MR of a scanner 410 to be employed in the LiDAR is 150 degrees for verification of overlapping with a camera within the electronic apparatus employing the LiDAR.

Meanwhile, considering the optical angle margin of 10 degrees in addition to the maximum optical angle of 150 degrees of the mirror MR, the maximum value of the final optical angle of the mirror MR is preferably 160 degrees. Accordingly, the present disclosure proposes a scanner in which the maximum value of the final optical angle of the mirror MR is 160 degrees.

In other words, considering that the maximum value of the rotation angle relative to the second axis Axisx is 37.5 degrees and the driving angle margin is 2.5 degrees in response to the mirror MR rotating around the first axis Axisy, the present disclosure proposes a scanner in which the maximum value of the final rotation angle relative to the second axis Axisx is 40 degrees. Accordingly, the maximum value of the final optical angle of the mirror MR is preferably 160 degrees.

Meanwhile, in response to the maximum value exceeding 160 degrees, as the final optical angle of the mirror MR increases, an optical loss may occur due to the substrate or a surrounding structure disposed on the path of reflected light, the risk of damage to silicon-based mirror springs may be considerably increased, or the size of a scanner or a scanner module may be increased due to the arrangement of the substrate and surrounding structure being separated from each other.

As a result, the present disclosure proposes a scanner in which the final optical angle of the mirror MR ranges from 100 degrees to 160 degrees.

In other words, considering the driving angle margin, the present disclosure proposes a scanner in which the final rotation angle relative to the second axis Axisx ranges from 25 degrees to 40 degrees in response to the mirror MR rotating around the first axis Axisy.

In particular, the present disclosure proposes a scanner in which the final optical angle of the mirror MR ranges from 100 degrees to 160 degrees as a direct drive type scanner applicable to the electrostatic force-based method. The proposed scanner will be described with reference to FIG. 4A.

Figure 4A:
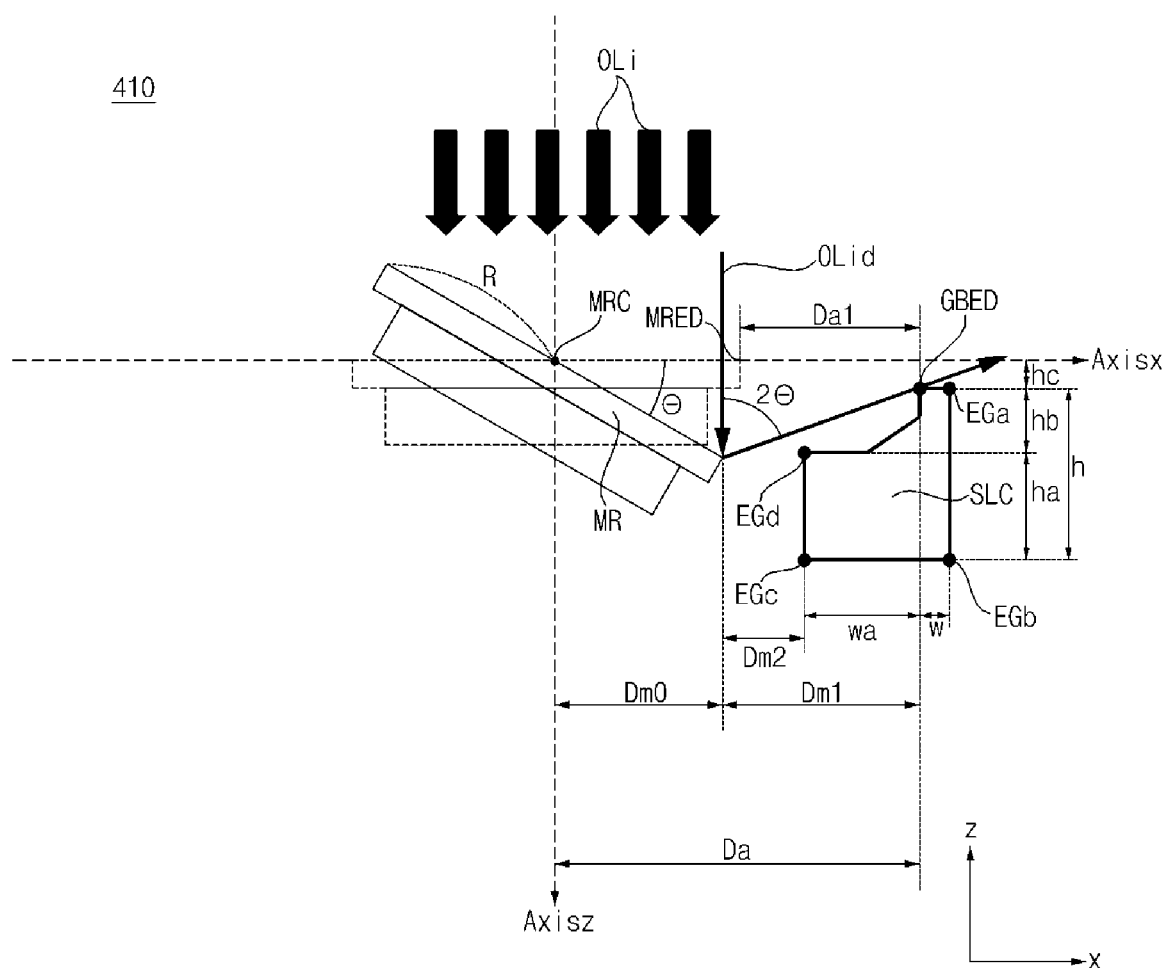

FIG. 4A shows a case in which light is reflected to a first area of FIG. 3A.

Referring to the figure, the mirror MR rotates around the first axis Axisy based on the electrostatic force-based direct drive mechanism, and the substrate SLC is disposed to be separated from the mirror MR. In fact, the substrate SLC may be disposed to be separated from the side and rear surfaces of the mirror MR.

Meanwhile, the right side of the mirror MR corresponds to the first area of FIG. 3A, and the substrate SLC may be etched to form a step (EDba of FIG. 3A).

Meanwhile, FIG. 4A illustrates a case in which the mirror MR rotates by an angle of θ in a downward direction relative to the second axis Axisx.

Accordingly, the incident light OLi incident on the right edge MRED of the mirror MR rotating downward on the right side is reflected by the mirror MR and passes through a point on the second axis Axisx.

Meanwhile, to reduce the width of the substrate SLC, the present disclosure forms a first edge GBED and a second edge EGd, which is closer to the mirror MR than the first edge GBED and disposed at a lower position than the first edge GBED, on the substrate SLC.

In particular, it is preferable to set the optical interference angle to be larger at the second edge EGd than at the first edge GBED.

When θ shown in the figure is larger than the maximum rotation angle of the mirror MR, the light reflected from the mirror MR interferes at the first edge GBED but does not interfere at the second edge EGd.

Accordingly, interference due to the second edge EGd does not occur, and wide-angle scanning dependent on the position of the first edge GBED is made possible. Accordingly, the position of the first edge GBED becomes important in the design phase.

In particular, the distance between the first edge GBED and the center of the mirror MR and the height of a step at the first edge GBED are important.

Meanwhile, a step is formed at the first edge GBED with respect to the upper surface of the mirror MR. Accordingly, it is possible to reduce optical interference and element size while performing wide-angle scanning.

Meanwhile, the figure shows a case in which a step is formed at the first edge GBED; however, according to the present disclosure, it is also possible that the first edge GBED is formed at the same position as the upper surface of the mirror MR. In what follows, descriptions are given based primarily on the assumption that a step is formed at the first edge GBED.

Meanwhile, by forming a step EDba corresponding to the first area, light is output to the outside without optical loss due to the substrate SLC.

Meanwhile, the first and second edges are connected with a partial slope, with a full slope, or at the right angle. Accordingly, various shapes may be implemented through etching.

Meanwhile, FIG. 4A shows a case in which the first edge GBED and the second edge EGd are connected through a partial slope.

Meanwhile, FIG. 4A shows a third edge EGa formed on the right side of the first edge GBED, a fourth edge EGb formed below the third edge EGa, a fifth edge EGc formed on the left side of the fourth edge EGb, and the second edge EGd formed above the fifth edge EGc.

Figure 4B:
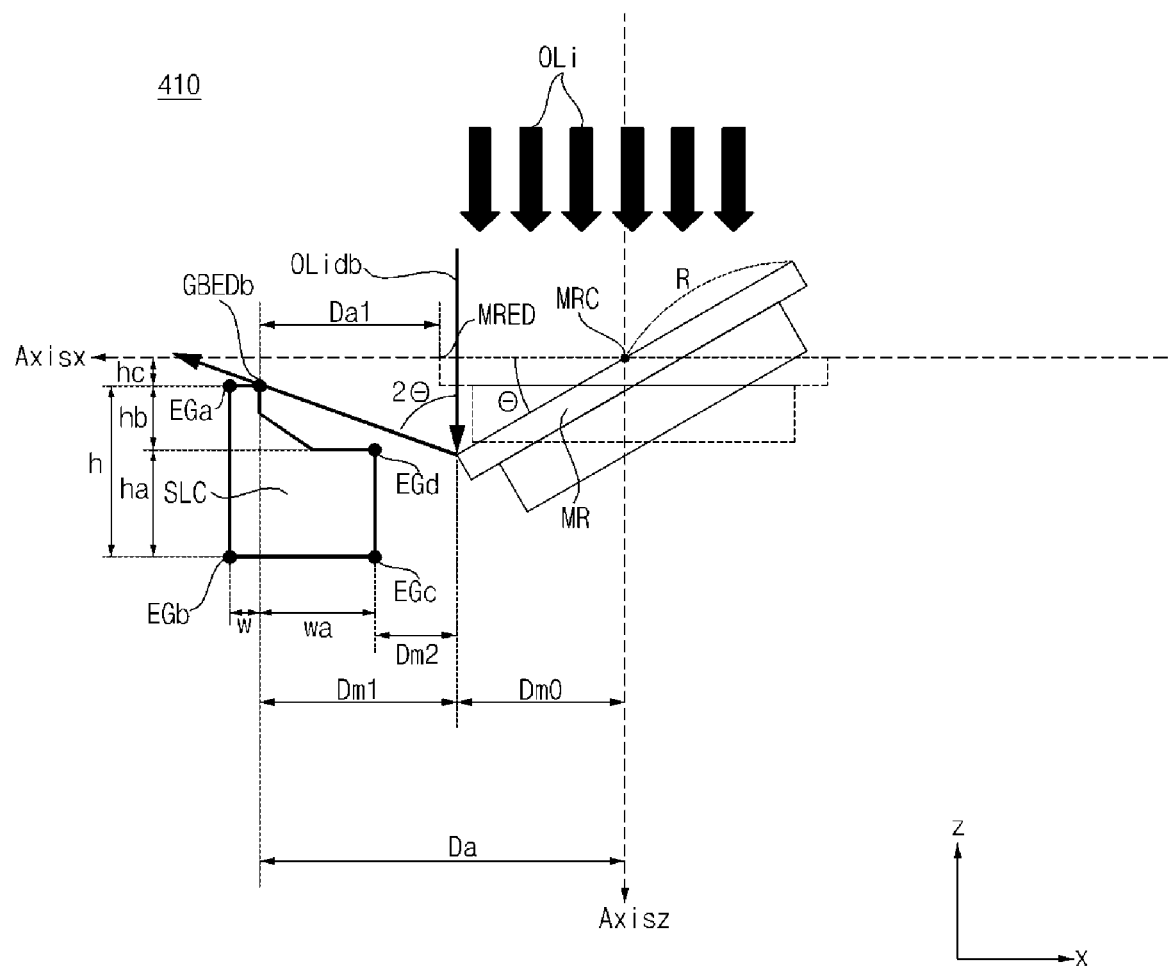

FIG. 4B shows a case in which light is reflected toward the first and second areas of FIG. 3A.

Referring to the figure, the mirror MR rotates around the first axis Axisy based on the electrostatic force-based direct drive mechanism, and the substrate SLC is disposed to be separated from the mirror MR. In fact, the substrate SLC may be disposed to be separated from the side and rear surfaces of the mirror MR.

Meanwhile, the left side of the mirror MR corresponds to the second area of FIG. 3A, and the substrate SLC may be etched to form a step (EDaa of FIG. 3A).

Meanwhile, FIG. 4B illustrates a case in which the mirror MR rotates by an angle of θ in a downward direction relative to the second axis Axisx.

Accordingly, the incident light OLi incident on the left edge MRED of the mirror MR rotating downward on the left side is reflected by the mirror MR and passes through a point on the second axis Axisx.

Meanwhile, to reduce the width of the substrate SLC, the present disclosure forms a first edge GBED and a second edge EGd, which is closer to the mirror MR than the first edge GBED and disposed at a lower position than the first edge GBED, on the substrate SLC.

In particular, it is preferable to set the optical interference angle to be larger at the second edge EGd than at the first edge GBED.

Figure 4C:
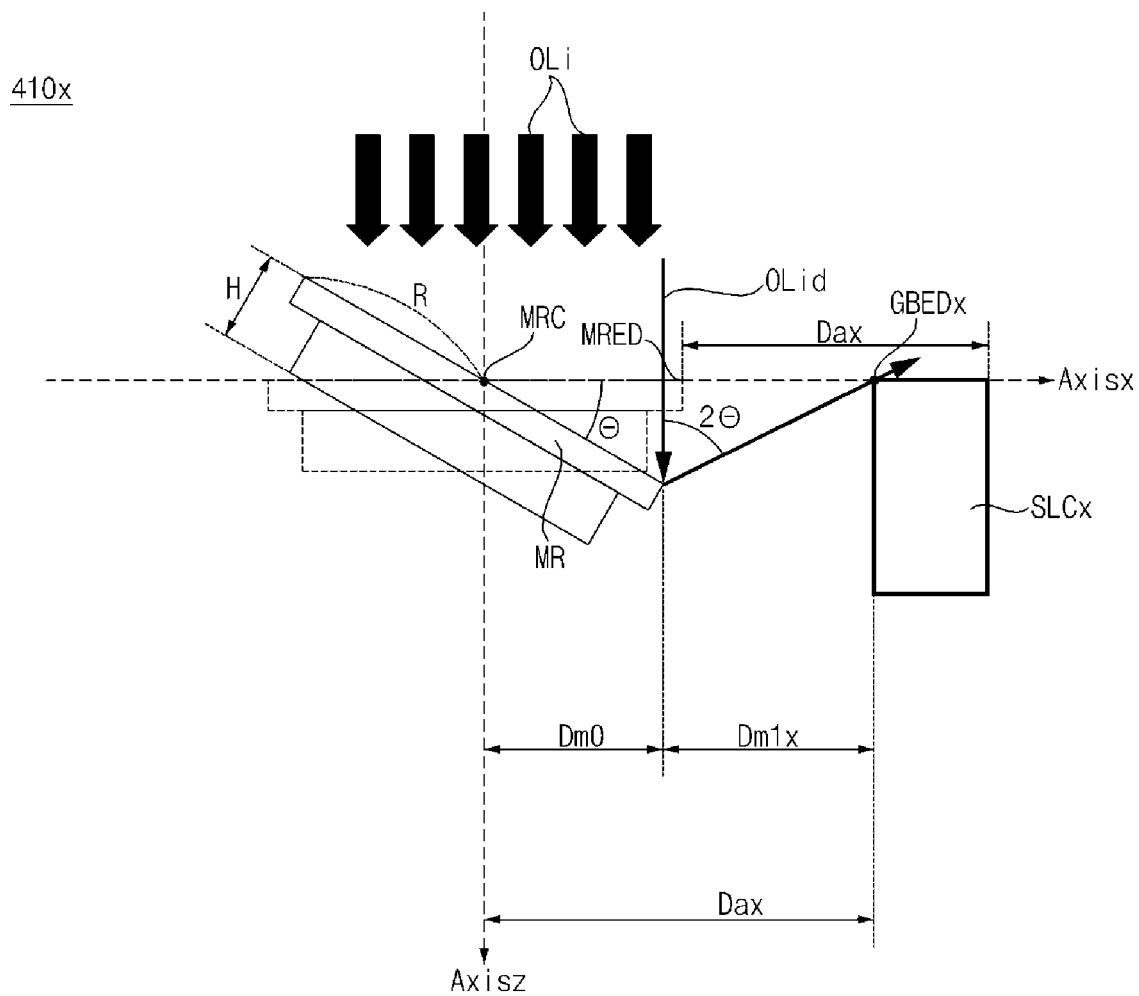

Next, FIG. 4C shows a scanner $410x$ in which a step is not formed, differently from FIGS. 4A and 4B.

Referring to the figure, the substrate SLCx is disposed on the second axis Axisx, the same axis on which the upper surface of the mirror MR is disposed.

In this case, Dax, which is a gap or a distance between the center MRC of the mirror MR and a point GBEDx on the second axis Axisx, corresponds to the reflected light path of the upper substrate in the first area and is expressed as a sum of Dm0 and Dm1x, which is calculated by Eq. 1 below.

$$Dax = R\cos(\theta) + R\sin(\theta)\tan(2\theta) \quad [\text{Eq. 1}]$$

In Eq. 1, R represents the radius of the mirror MR, $\theta$ represents a rotation angle of the mirror MR relative to the second axis Axisx, Dmo corresponds to $R\cos(\theta)$, and Dm1x corresponds to $R\sin(\theta)\tan(2\theta)$.

Based on the principle, it is preferable that the position of the side surface of the substrate, which lies in the first area, is larger than Dax for wide-angle scanning. However, the wider the angle, the larger the Dax becomes, which brings a disadvantage in that the element size also increases.

Therefore, to reduce the element size, it is preferable to prevent optical loss by applying a step EDba to the first area, as shown in FIGS. 4A and 4B.

Meanwhile, based on Eq. 1, the width Da of the first area corresponding to the optical angle 100 degrees of the mirror MR corresponds to 1.41 times the radius R of the mirror MR, and the width Da of the first area corresponding to the optical angle 160 degrees of the mirror MR corresponds to 4.41 times the radius R of the mirror MR.

Accordingly, in the cases of FIGS. 4A and 4B, in response to the mirror MR rotating around the first axis Axisy, the magnitude of the rotation angle relative to the second axis Axisx intersecting the first axis Axisy is 40 degrees, and when the radius of the mirror MR is R, the distance between the center of the mirror MR and the first edge GBED is set to be smaller than 4.41R. Accordingly, it is possible to reduce optical interference and element size while performing wide-angle scanning.

Figure 4D:
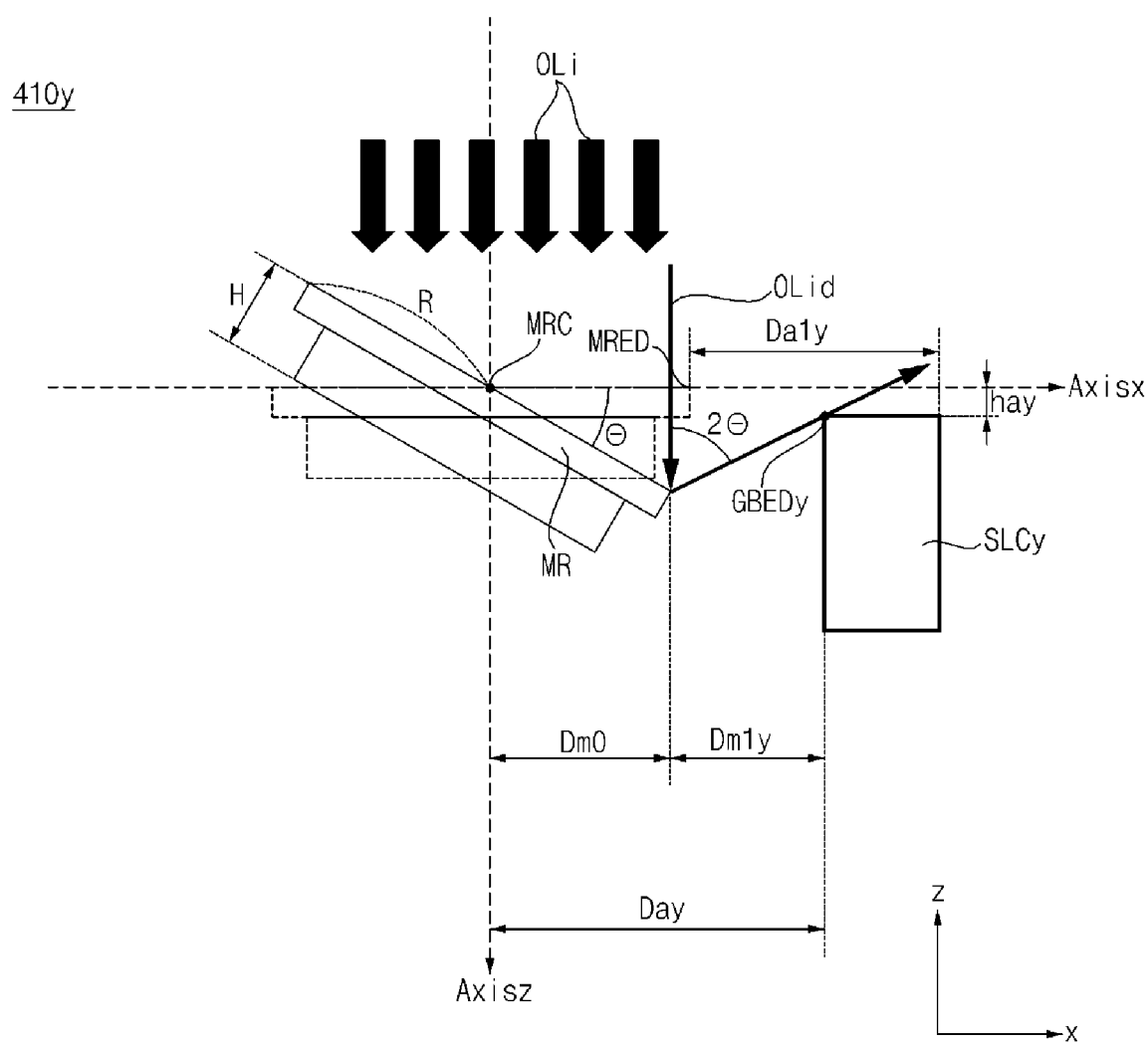

Next, FIG. 4D shows a scanner $410y$ in which a step is formed similarly to FIGS. 4A and 4B.

Referring to the figure, the substrate SLCy is separated by the distance of a step from the second axis Axisx, the same axis on which the upper surface of the mirror MR is disposed.

From FIG. 4D, suppose that in response to the mirror MR rotating around the first axis Axisy, the magnitude of a rotation angle relative to the second axis Axisx is denoted by theta, the thickness of the mirror MR is denoted by H, and the radius of the mirror MR is denoted by R. Then, the height hay of the step formed at the first edge GBEDy of the substrate SLCy may be calculated by Eq. 2 below.

$$hay = R \times \sin(\theta) + H \times \cos(\theta) \quad [\text{Eq. 2}]$$

Meanwhile, as described above, when $\theta$ ranges from 25 degrees to 40 degrees, the height hay of the step formed at the first edge GBEDy of the substrate SLCy may be obtained by $0.42R+0.9H$ to $0.64R+0.76H$.

Meanwhile, according to the structure above, since the first edge GBEDy of the substrate SLCy corresponds to the leftmost part of the substrate SLCy, there is a disadvantage in that the distance between the first edge GBEDy of the substrate SLCy and the center MRC of the mirror MR has to be larger than a predetermined distance. Or, there is a disadvantage in that the distance between the first edge GBEDy of the substrate SLCy and the edge of the mirror MR has to be larger than a predetermined distance.

Therefore, as shown in FIG. 4A or 4B, the present disclosure forms a first edge GBED and a second edge EGd, which is closer to the mirror MR than the first edge GBED and disposed at a lower position than the first edge GBED, on the substrate SLC.

In the scanner 410 of FIG. 4A, although the shortest distance between the substrate SLC and the edge of the mirror MR is Dm2, the shortest distance between the substrate SLCy and the edge of the mirror MR in the scanner $410y$ of FIG. 4D is Dm1y, and Dm2 has a much smaller value.

Therefore, the width of the substrate SLC in the scanner 410 of FIG. 4A becomes much smaller, and as a result, a scanner 410 based on smaller element size may be implemented.

Meanwhile, FIGS. 3A to 4B show cases in which a step is formed in a partial area of the substrate SLC, but it is still possible to implement a substrate being divided into an upper substrate and a lower substrate. The latter case will be described with reference to FIGS. 5A to 5C.

Figure 5A:
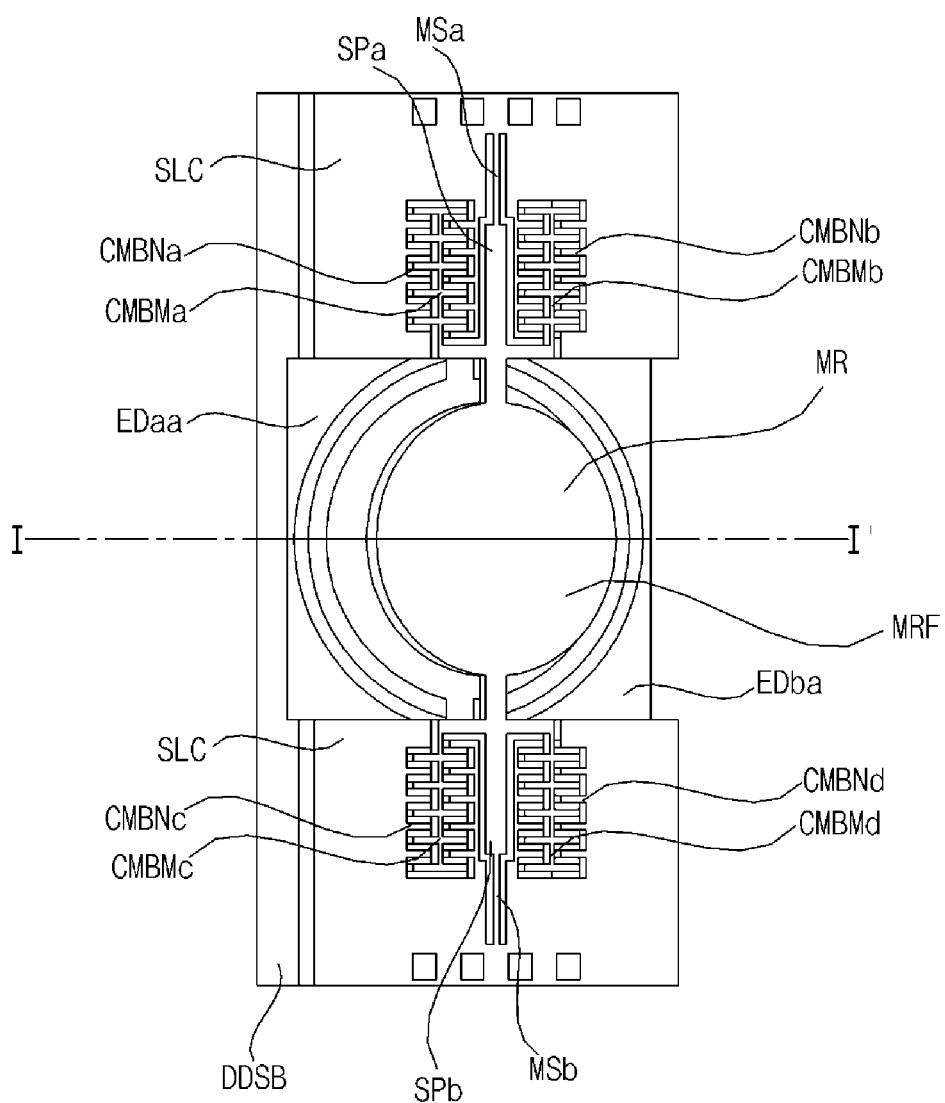
FIG. 5A illustrates a scanner according to another embodiment of the present disclosure.
Figure 5B:
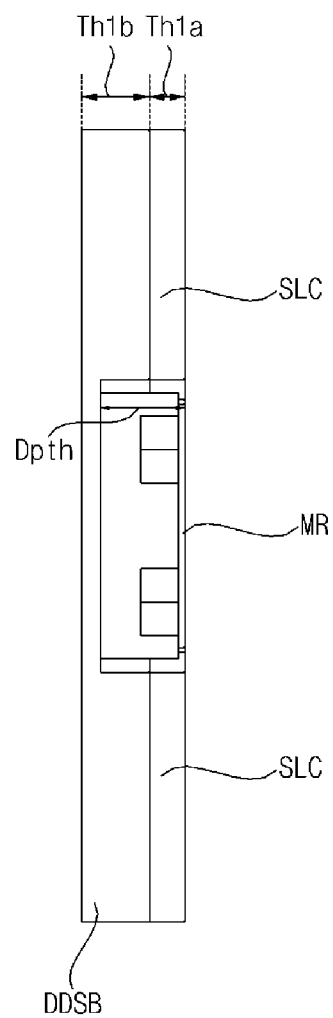
FIGS. 5B to 5C are drawings referenced for description of FIG. 5A.
Figure 5C:
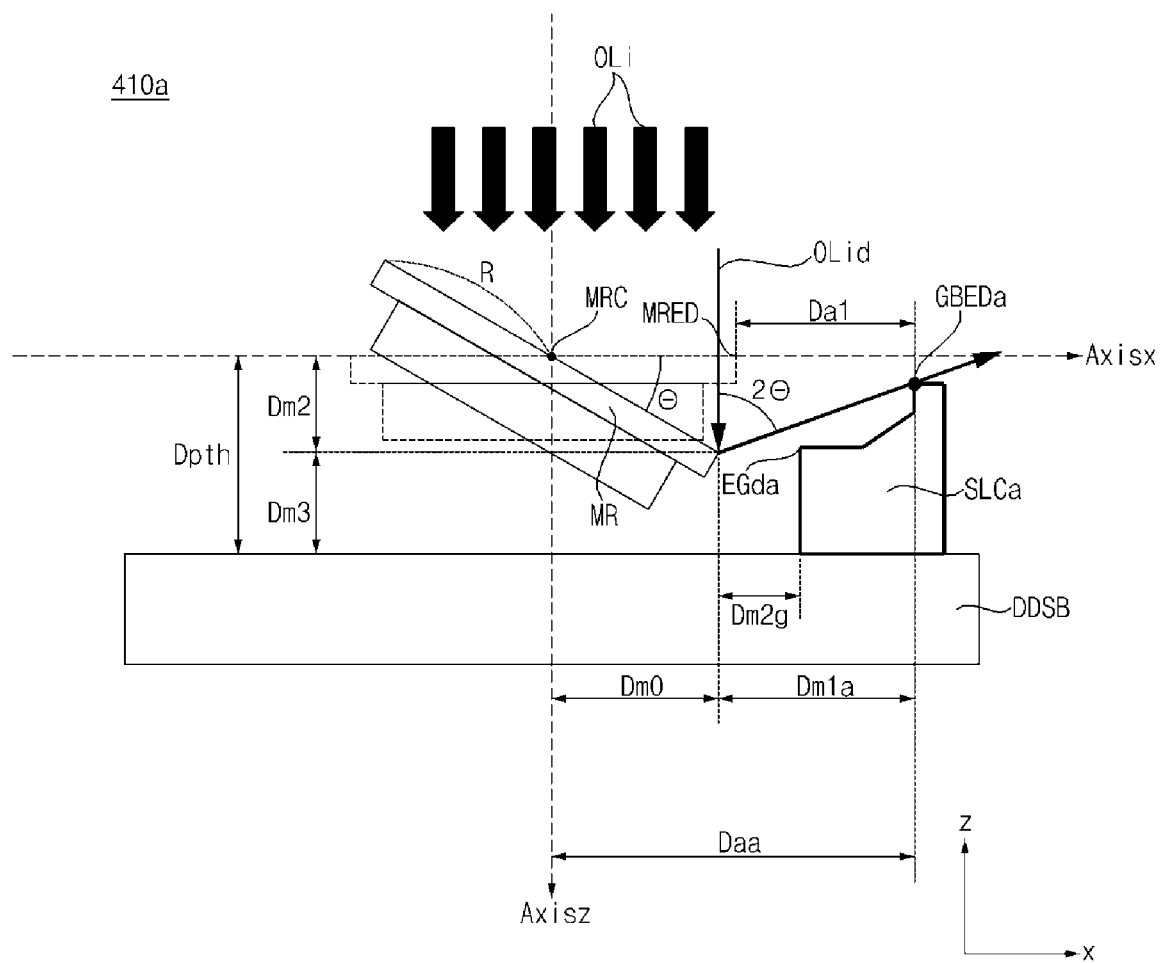

FIG. 5A illustrates a scanner according to another embodiment of the present disclosure, FIG. 5B illustrates a side view of the scanner of FIG. 5A, and FIG. 5C is a drawing referenced for description of FIG. 5A.

Referring to the figure, the scanner $410aa$ according to an embodiment of the present disclosure may be a scanner based on the electrostatic force-based direct drive mechanism similar to the scanner 410 of FIGS. 3A to 4C. In what follows, descriptions will be given primarily based on differences between the scanners.

To this purpose, the scanner $410aa$ includes a mirror MR rotating about a first axis Axisy based on the direct drive mechanism; a first and a second mirror supporting member Spa, SPb connected respectively to the first and second sides of the mirror MR; a first and second mirror spring MSa, MSb connected respectively to the first and second mirror supporting members SPa, SPb; a plurality of combs CMBMa to CMBMd, CMBNa to CMBNd supplying a rotational force based on electrostatic force to the mirror MR; an upper substrate SLC separated from the outside of the mirror, and a lower substrate DDSB disposed in the lower part of the upper substrate SLC.

The upper substrate SLC may be placed apart from the mirror MR and formed in a rectangular shape on the outside around the mirror MR.

Meanwhile, steps EDba and EDaa are formed in the first and second areas, which are partial areas of the upper substrate SLC and the lower substrate DDSB, and which are both areas of the mirror MR. Accordingly, light may be output in both directions of the mirror MR, thereby enabling wide-angle scanning.

Meanwhile, steps EDba and EDaa may be formed in the upper substrate SLC and the lower substrate DDSB, and thus, collision with the lower substrate DDSB due to rotation of the mirror MR may be avoided.

Meanwhile, the widths of the upper substrate SLC and the lower substrate DDSB may be greater than or equal to the diameter of the mirror MR. Accordingly, it is possible to prevent damage to the mirror that may occur while the upper substrate SLC and the lower substrate DDSB are handled.

Next, FIG. 5C shows a case in which light is reflected toward the first area.

Referring to the figure, the mirror MR rotates around the first axis Axisy based on the electrostatic force-based direct drive mechanism, and the upper substrate SLCa and the lower substrate DDSB are disposed being separated from the mirror MR. In fact, the upper substrate SLCa may be disposed being separated from the side and rear surfaces of the mirror MR.

Meanwhile, the right side of the mirror MR corresponds to the first area of FIG. 5A, and the upper substrate SLCa may be etched to form a step (EDba of FIG. 5A).

Meanwhile, FIG. 5C illustrates a case in which the mirror MR rotates by an angle of θ in a downward direction relative to the second axis Axisx.

Accordingly, the incident light OLi incident on the right edge MRED of the mirror MR rotating downward on the right side is reflected by the mirror MR and passes through a point on the second axis Axisx.

Meanwhile, to reduce the width of the upper substrate SLCa, the present disclosure forms a first edge GBEDa and a second edge EGda, which is closer to the mirror MR than the first edge GBEDa and disposed at a lower position than the first edge GBEDa, on the substrate SLCa.

In particular, it is preferable to set the optical interference angle to be larger at the second edge EGda than at the first edge GBEDa.

In response to θ shown in the figure being larger than the maximum rotation angle of the mirror MR, the light reflected from the mirror MR interferes at the first edge GBEDa but does not interfere at the second edge EGda.

Accordingly, interference due to the second edge EGda does not occur, and wide-angle scanning dependent on the position of the first edge GBEDa is made possible. Accordingly, the position of the first edge GBEDa becomes important in the design phase.

In particular, the distance between the first edge GBEDa and the center of the mirror MR and the height of a step at the first edge GBEDa are important.

Meanwhile, a step is formed at the first edge GBEDa with respect to the upper surface of the mirror MR. Accordingly, it is possible to reduce optical interference and element size while performing wide-angle scanning.

Figure 6A:
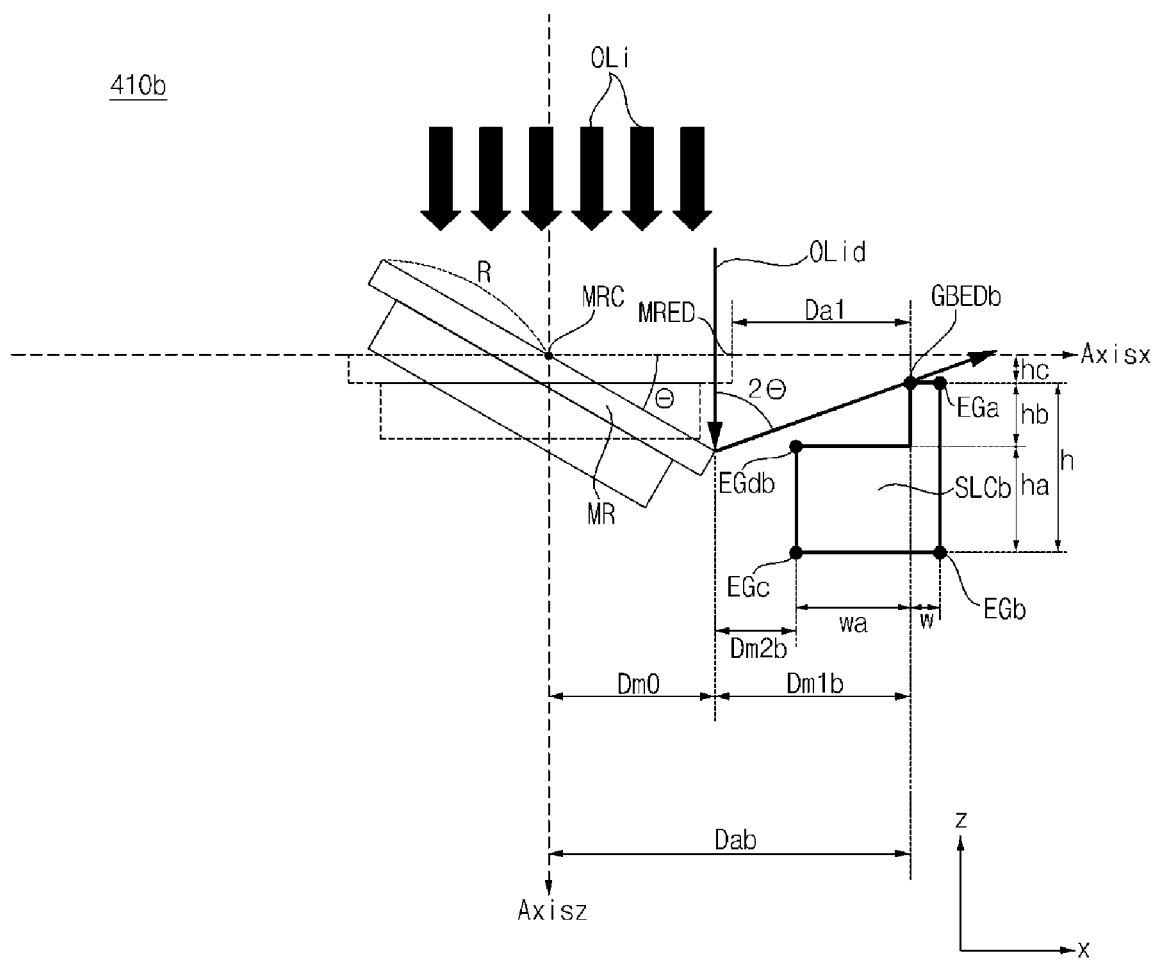
FIG. 6A illustrates a scanner according to yet another embodiment of the present disclosure.

FIG. 6A illustrates a scanner according to yet another embodiment of the present disclosure.

Referring to the figure, the scanner 410b of FIG. 6A is similar to the scanner 410 of FIG. 4A but differs from the scanner 410 in the etching shape of the substrate.

To reduce the width of the substrate SLCb of the scanner 410b of FIG. 6A, the present disclosure forms a first edge GBEDb and a second edge EGdb, which is closer to the mirror MR than the first edge GBEDb and disposed at a lower position than the first edge GBEDb, on the substrate SLCb.

In particular, it is preferable to set the optical interference angle to be larger at the second edge EGdb than at the first edge GBEDb.

Meanwhile, FIG. 6A shows a case in which the first edge GBEDb and the second edge EGdb are connected at the right angle.

Meanwhile, FIG. 6A shows a third edge EGa formed on the right side of the first edge GBEDb, a fourth edge EGb formed below the third edge EGa, a fifth edge EGc formed on the left side of the fourth edge EGb, and the second edge EGdb formed above the fifth edge EGc.

Meanwhile, the maximum stress σmax due to the shape of the substrate SLCy of FIG. 4D is inversely proportional to the height h and the width w of the substrate SLCy. As a result of the experiment, to maintain the maximum stress (σmax) at 1, w/h should be 0.4.

Figure 6B:
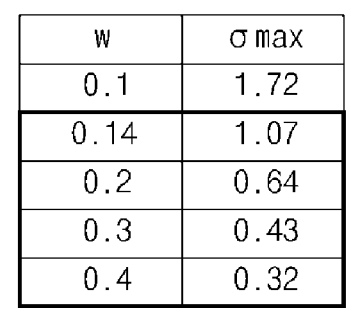
Figure 6C:
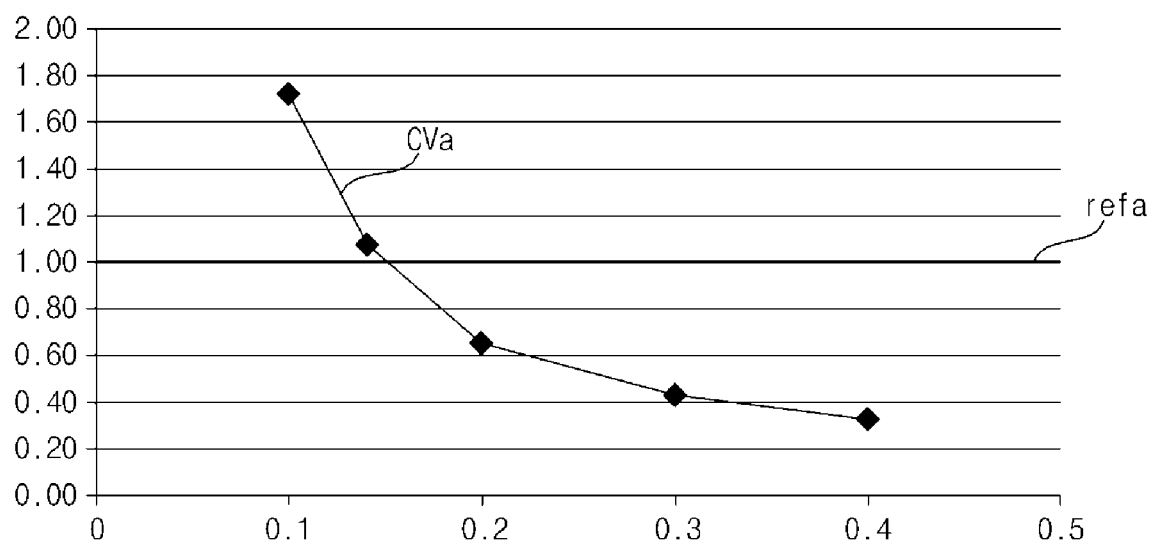

In this regard, FIGS. 6B to 6C are referenced to describe the maximum stress σmax for the etching shape of FIG. 6A.

FIGS. 6B to 6C are drawings referenced for the description of FIG. 6A.

Referring to the figures, in the substrate SLCb of the scanner 410b of FIG. 6A, it is preferable that w, which is the distance between the first edge GBEDb and the third edge EGa, has a value larger than or equal to approximately 0.13 to maintain the maximum stress σmax below or equal to the reference value, 1.

Figure 7A:
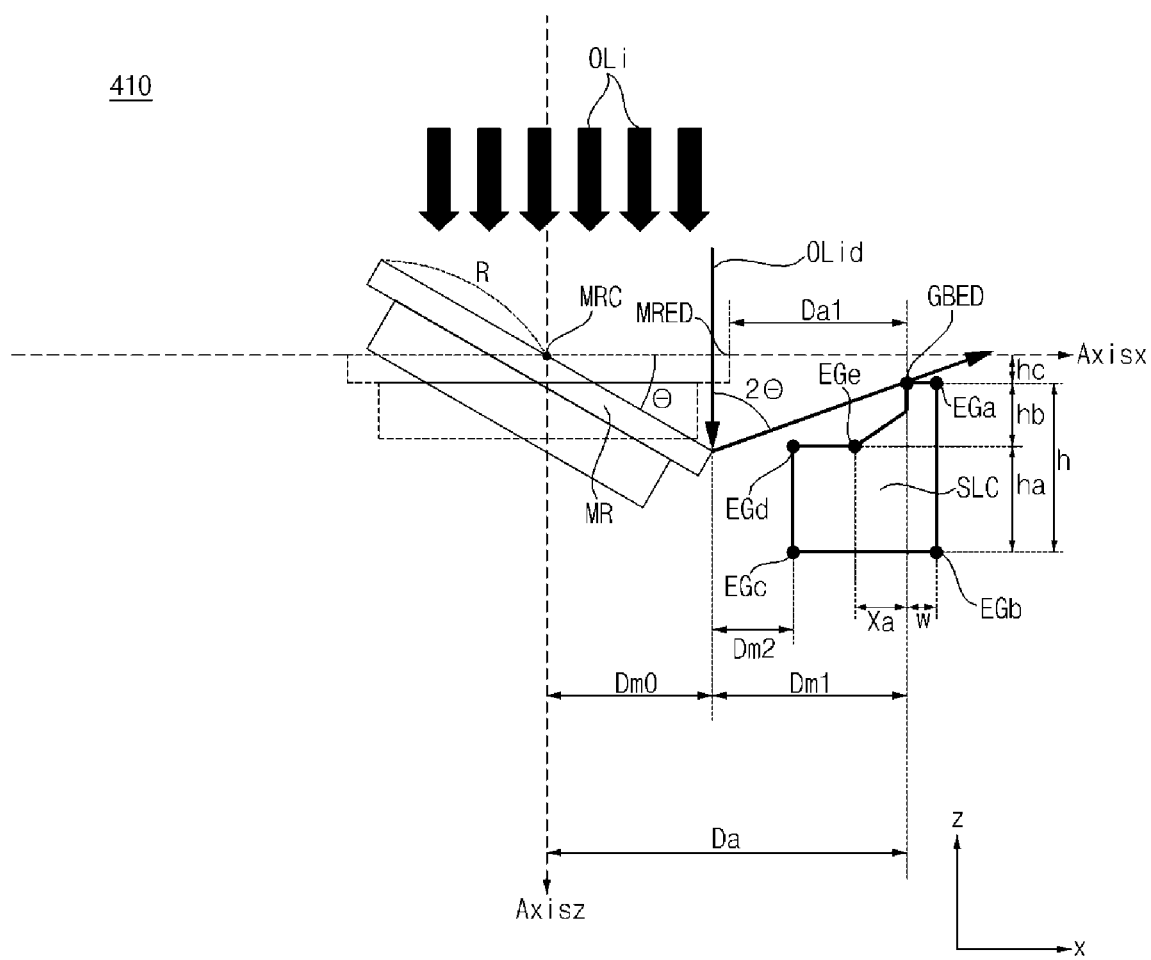
Figure 7C:
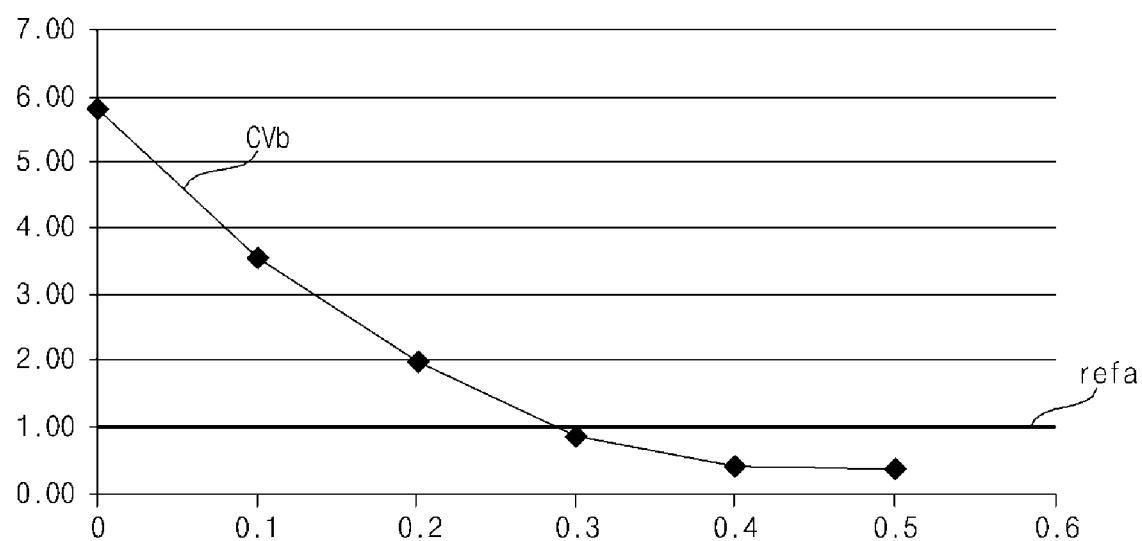

FIGS. 7A to 7C are drawings referenced for the description of FIG. 3A.

Referring to the figures, the scanner 410 of FIG. 7A is the same as the scanner 410 of FIG. 4A.

To reduce the width of the substrate SLC of the scanner 410 of FIG. 7A, the present disclosure forms a first edge GBED and a second edge EGd, which is closer to the mirror MR than the first edge GBED and disposed at a lower position than the first edge GBED, on the substrate SLC.

In particular, it is preferable to set the optical interference angle to be larger at the second edge EGd than at the first edge GBED.

Meanwhile, FIG. 7A shows a case in which the first edge GBED and the second edge EGd are connected with a partial slope.

Meanwhile, FIG. 7A shows a third edge EGa formed on the right side of the first edge GBED, a fourth edge EGb formed below the third edge EGa, a fifth edge EGc formed on the left side of the fourth edge EGb, and the second edge EGd formed above the fifth edge EGc.

Meanwhile, a sixth edge EGe is formed on the right side of the second edge EGd, and the first edge GBED is formed on the upper right side of the sixth edge EGe.

Referring to FIGS. 7B to 7C, in the substrate SLC of the scanner 410 of FIG. 7A, it is preferable that xa, which is the distance between the sixth edge EGe and the first edge GBED, has a value larger than or equal to approximately 0.3 to maintain the maximum stress σmax below or equal to the reference value, 1.

Figure 8A:
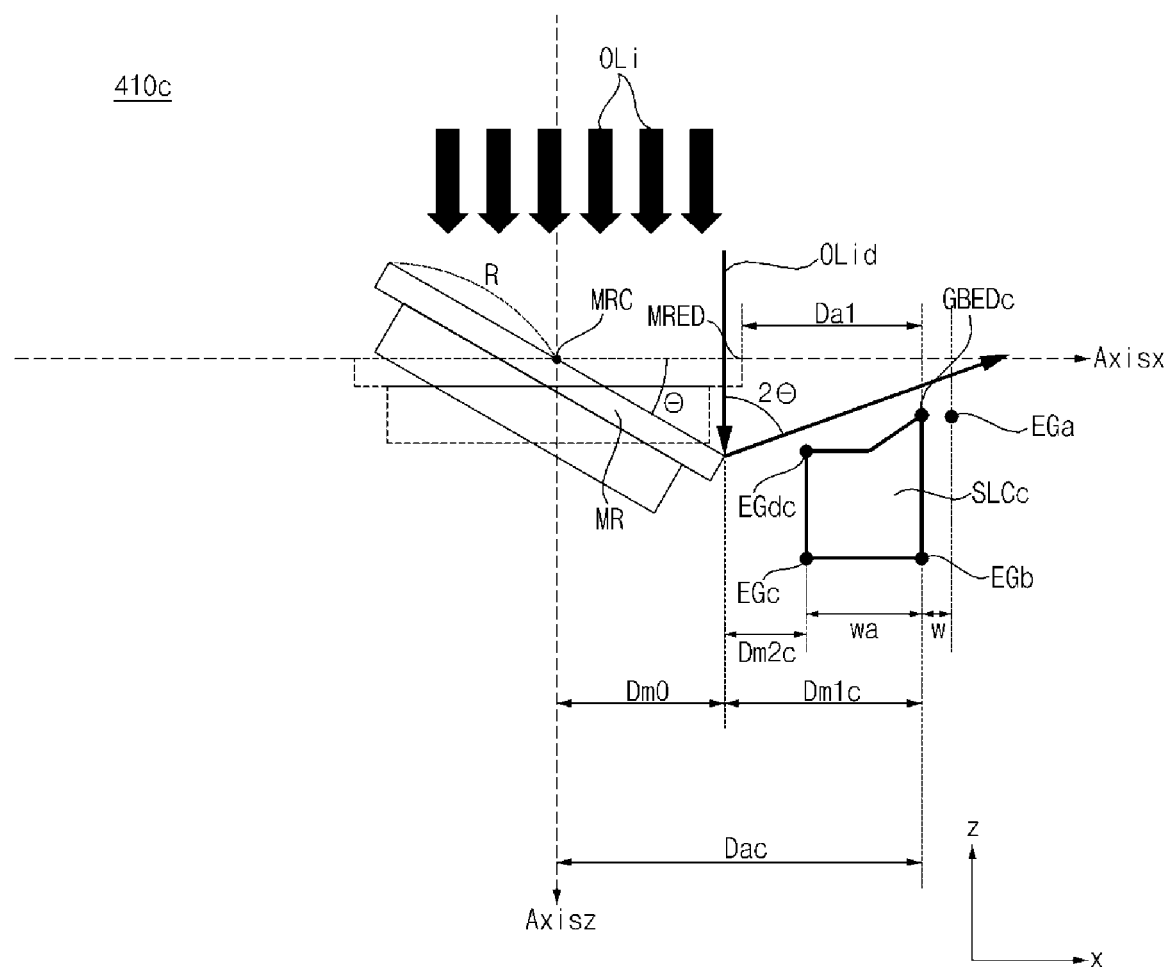
FIG. 8A illustrates a scanner according to still another embodiment of the present disclosure.

FIG. 8A illustrates a scanner according to still another embodiment of the present disclosure.

Referring to the figure, the scanner 410c of FIG. 8A is similar to the scanner 410 of FIG. 4A but differs from the scanner 410 in the etching shape of the substrate.

To reduce the width of the substrate SLCc of the scanner 410c of FIG. 8A, the present disclosure forms a first edge GBEDc and a second edge EGdc, which is closer to the mirror MR than the first edge GBEDc and disposed at a lower position than the first edge GBEDc, on the substrate SLCc.

In particular, it is preferable to set the optical interference angle to be larger at the second edge EGdc than at the first edge GBEDc.

Meanwhile, FIG. 8A shows a case in which the first edge GBED and the second edge EGd are connected with a partial slope.

Meanwhile, FIG. 8A shows a fourth edge EGb formed below the first edge GBEDc, a fifth edge EGc formed on the left side of the fourth edge EGb, and a second edge EGdc formed above the fifth edge EGc.

FIG. 8A differs from FIG. 7A and related drawings in that the third edge EGa is absent.

Figure 8B:
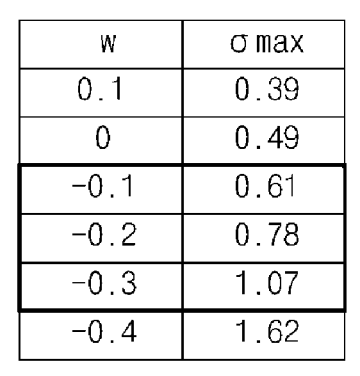
Figure 8C:
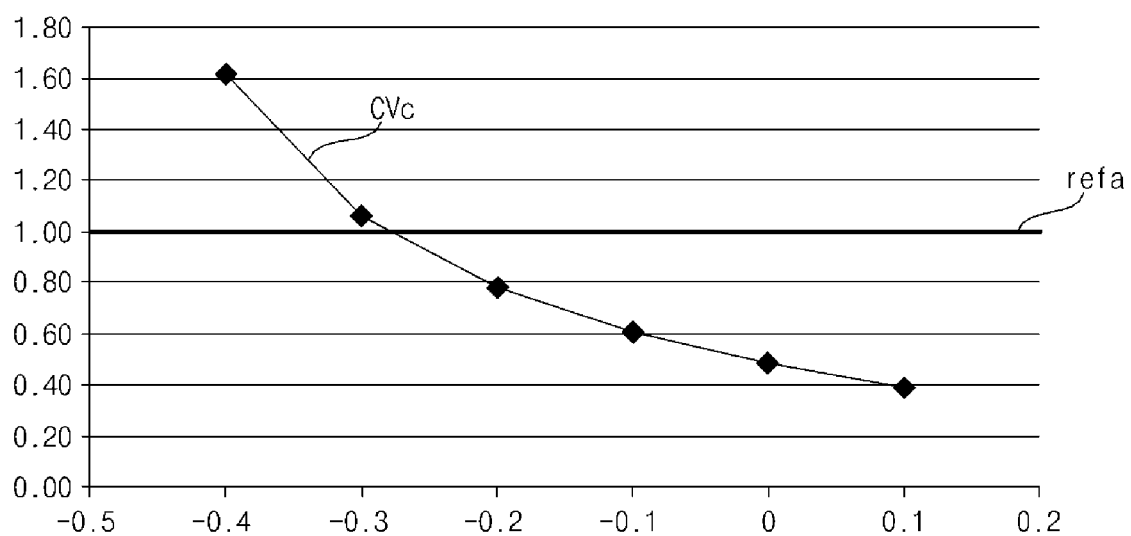

FIGS. 8B to 8C are drawings referenced for the description of FIG. 8A.

Provided that the third edge EGa exists, referring to the figures, in the substrate SLCc of the scanner 410c of FIG. 8A, it is preferable that w, which is the distance between the first edge GBEDc and the third edge EGa, has a value smaller than or equal to approximately 0.1 to maintain the maximum stress σmax below or equal to the reference value, 1.

In other words, to maintain the maximum stress σmax below or equal to the reference value, 1, it is preferable that the third edge EGa does not exist; in particular, to maintain the maximum stress, it is preferable that w has a value smaller than or equal to approximately 0.1. Therefore, compared to FIGS. 7A and 6A, the width of the substrate may be further reduced.

Figure 9A:
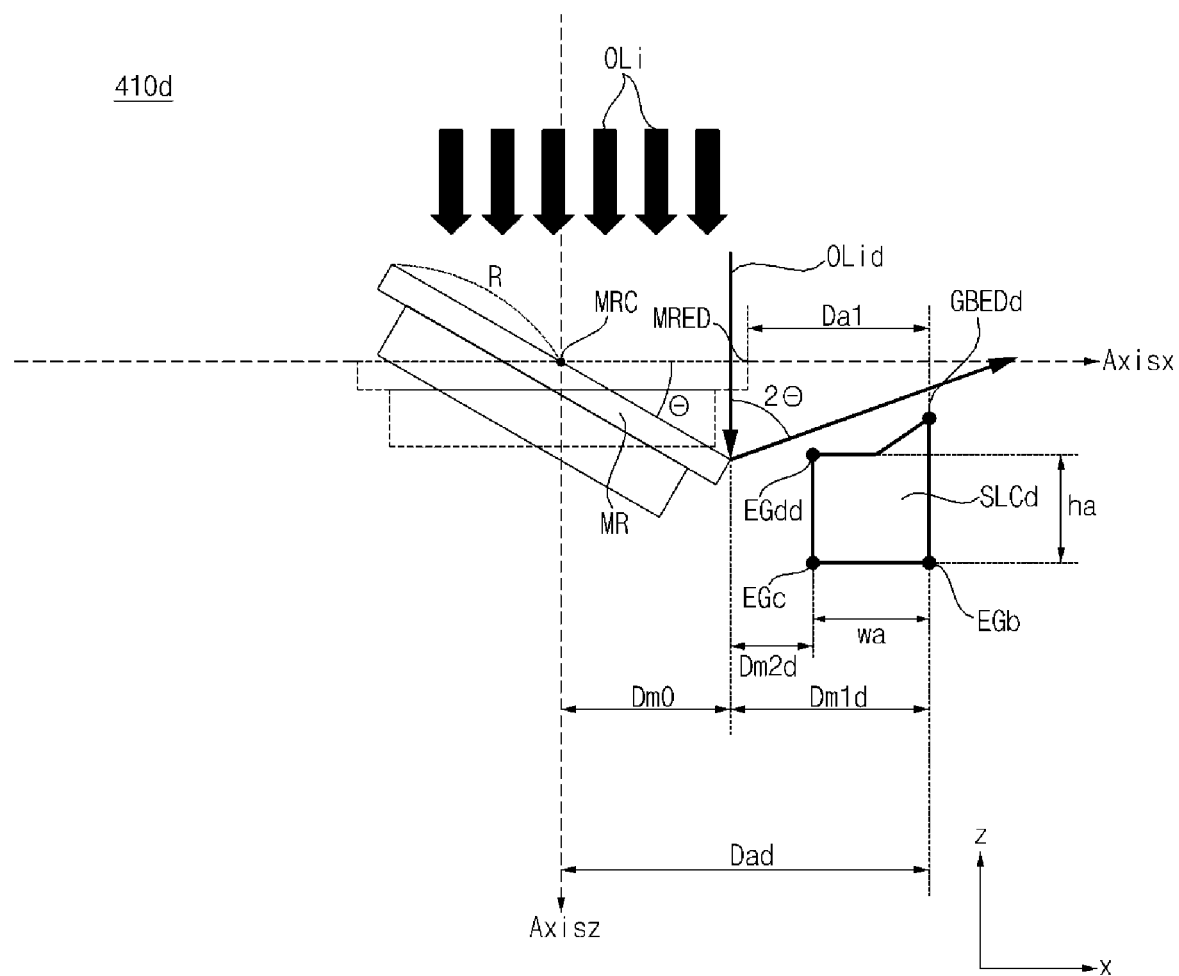
FIG. 9A illustrates a scanner according to yet still another embodiment of the present disclosure.

FIG. 9A illustrates a scanner according to yet still another embodiment of the present disclosure.

Referring to the figure, the scanner 410d of FIG. 9A is similar to the scanner 410 of FIG. 4A but differs from the scanner 410 in the etching shape of the substrate.

To reduce the width of the substrate SLCd of the scanner 410d of FIG. 9A, the present disclosure forms a first edge GBEDd and a second edge EGdd, which is closer to the mirror MR than the first edge GBEDd and disposed at a lower position than the first edge GBEDd, on the substrate SLCd.

In particular, it is preferable to set the optical interference angle to be larger at the second edge EGdd than at the first edge GBEDd.

Meanwhile, FIG. 9A shows a case in which the first edge GBEDd and the second edge EGdd are connected with a partial slope.

Meanwhile, FIG. 9A shows a fourth edge EGb formed below the first edge GBEDd, a fifth edge EGc formed on the left side of the fourth edge EGb, and a second edge EGdd formed above the fifth edge EGc.

FIG. 9A differs from FIG. 7A and related drawings in that the third edge EGa is absent.

Figure 9B:
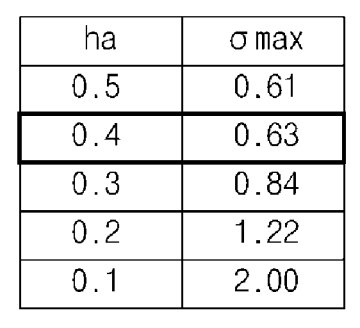
Figure 9C:
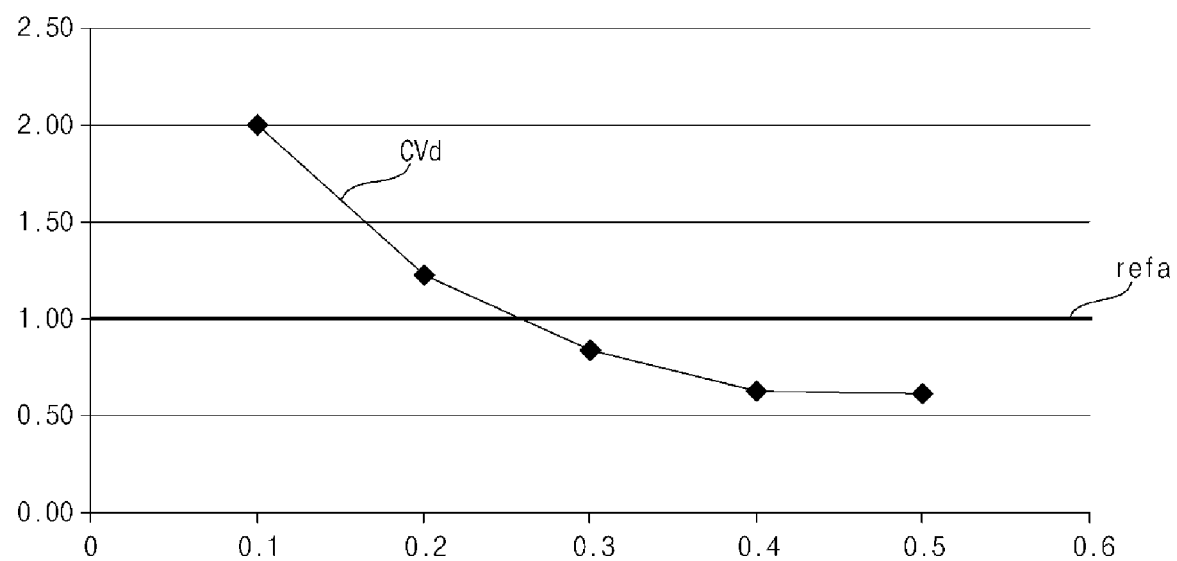

FIGS. 9B to 9C are drawings referenced for the description of FIG. 9A.

Referring to the figures, in the substrate SLCd of the scanner 410d of FIG. 9A, it is preferable that ha, which is the distance between the fifth edge EGc and the second edge EGdd, has a value larger than or equal to approximately 0.25 to maintain the maximum stress σmax below or equal to the reference value, 1.

Figure 10A:
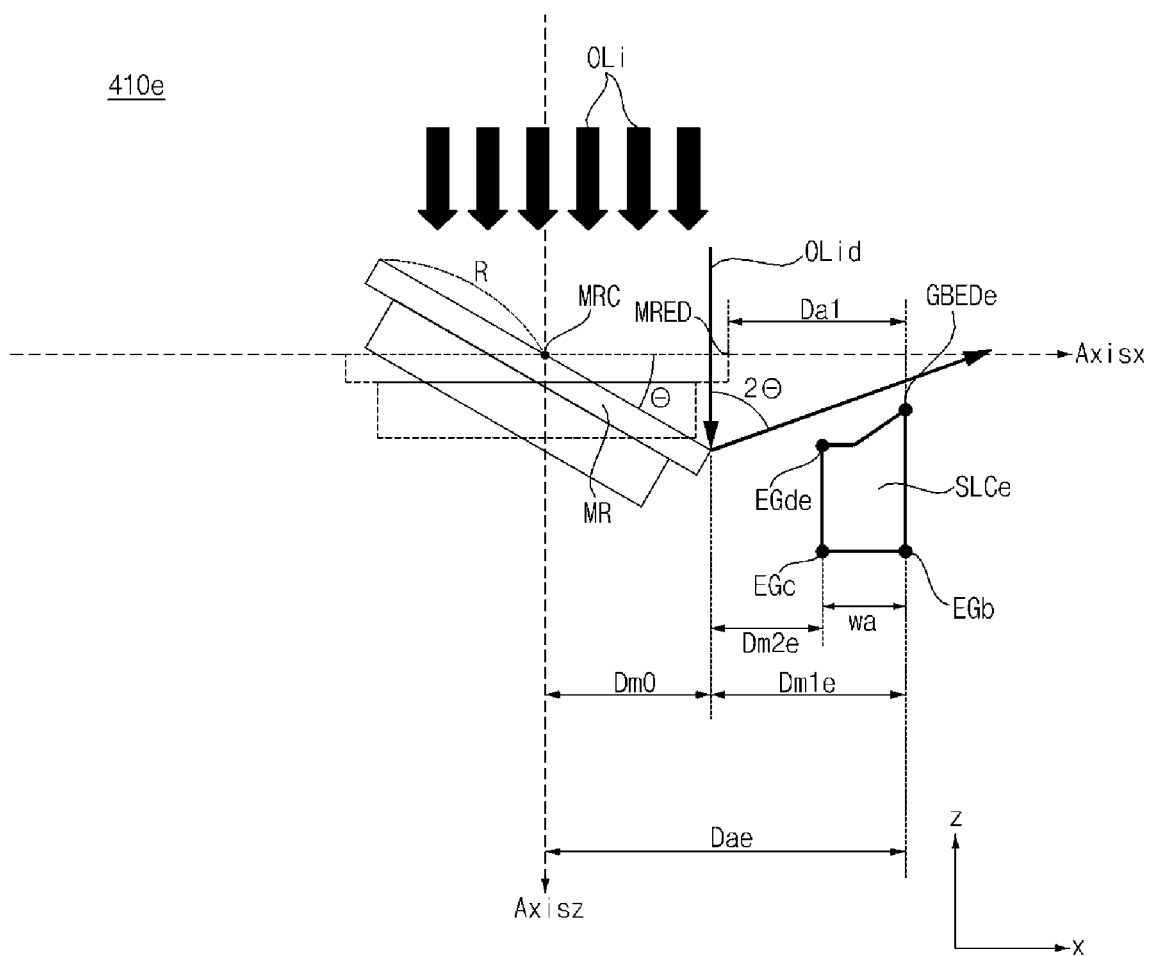
FIG. 10A illustrates a scanner according to still yet another embodiment of the present disclosure.

FIG. 10A illustrates a scanner according to still yet another embodiment of the present disclosure.

Referring to the figure, the scanner 410e of FIG. 10A is similar to the scanner 410 of FIG. 4A but differs from the scanner 410 in the etching shape of the substrate.

To reduce the width of the substrate SLCe of the scanner 410e of FIG. 10A, the present disclosure forms a first edge GBEDe and a second edge EGde, which is closer to the mirror MR than the first edge GBEDe and disposed at a lower position than the first edge GBEDe, on the substrate SLCe.

In particular, it is preferable to set the optical interference angle to be larger at the second edge EGde than at the first edge GBEDe.

Meanwhile, FIG. 10A shows a case in which the first edge GBEDe and the second edge EGde are connected with a partial slope.

Meanwhile, FIG. 10A shows a fourth edge EGb formed below the first edge GBEDe, a fifth edge EGc formed on the left side of the fourth edge EGb, and a second edge EGde formed above the fifth edge EGc.

FIG. 10A differs from FIG. 7A and related drawings in that the third edge EGa is absent.

Figure 10C:
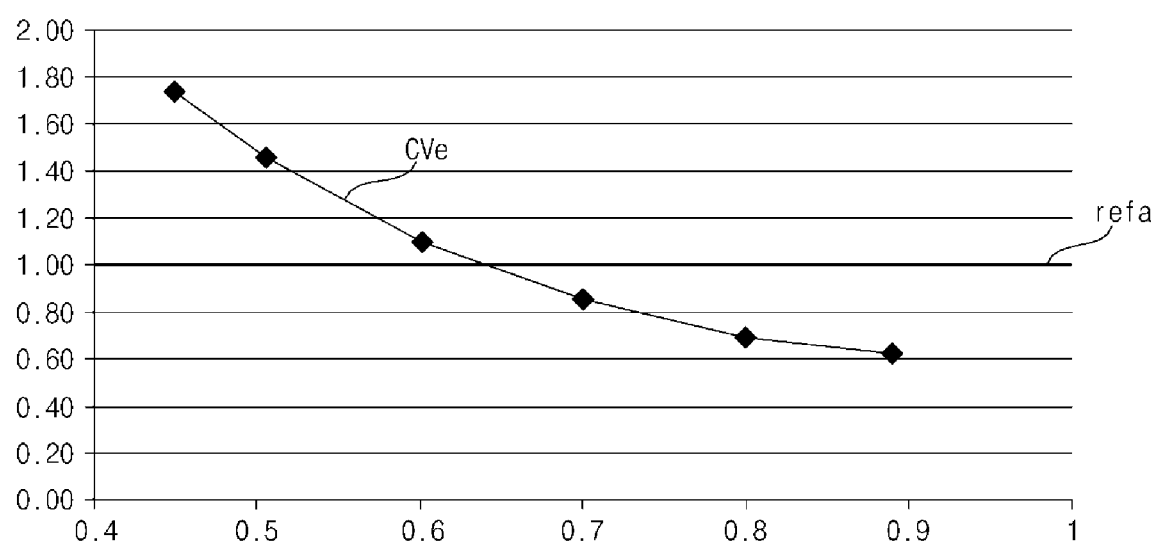

FIGS. 10B to 10C are drawings referenced for the description of FIG. 10A.

Referring to the figures, in the substrate SLCe of the scanner 410e of FIG. 10A, it is preferable that wa, which is the distance between the fourth edge EGb and the fifth edge EGc, has a value larger than or equal to approximately 0.64 to maintain the maximum stress σmax below or equal to the reference value, 1.

FIGS. 11 to 12C illustrate scanners according to various embodiments of the present disclosure.

First, FIG. 11 illustrates various shapes of a substrate SLC.

Referring to the figure, FIGS. 11(a) to (i) illustrate that a first GBED and a second edge EGd are connected with a partial slope, with a full slope, or at the right angle. Accordingly, various shapes may be implemented through etching.

Figure 12A:
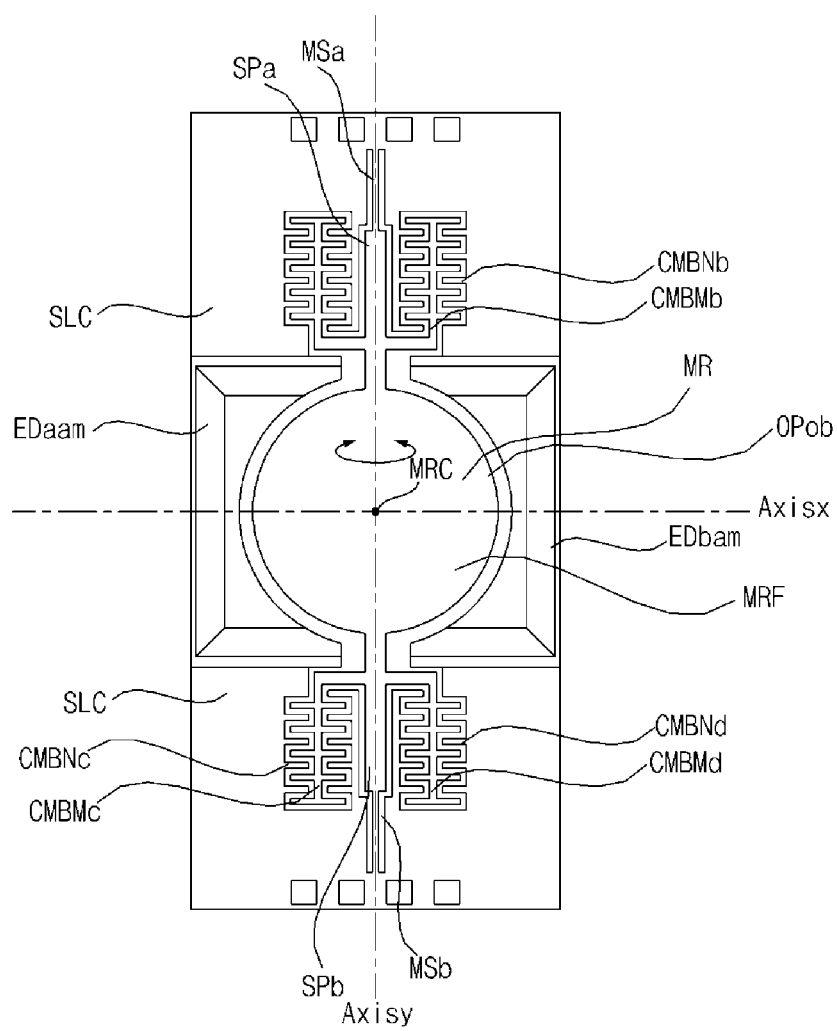
Figure 12B:
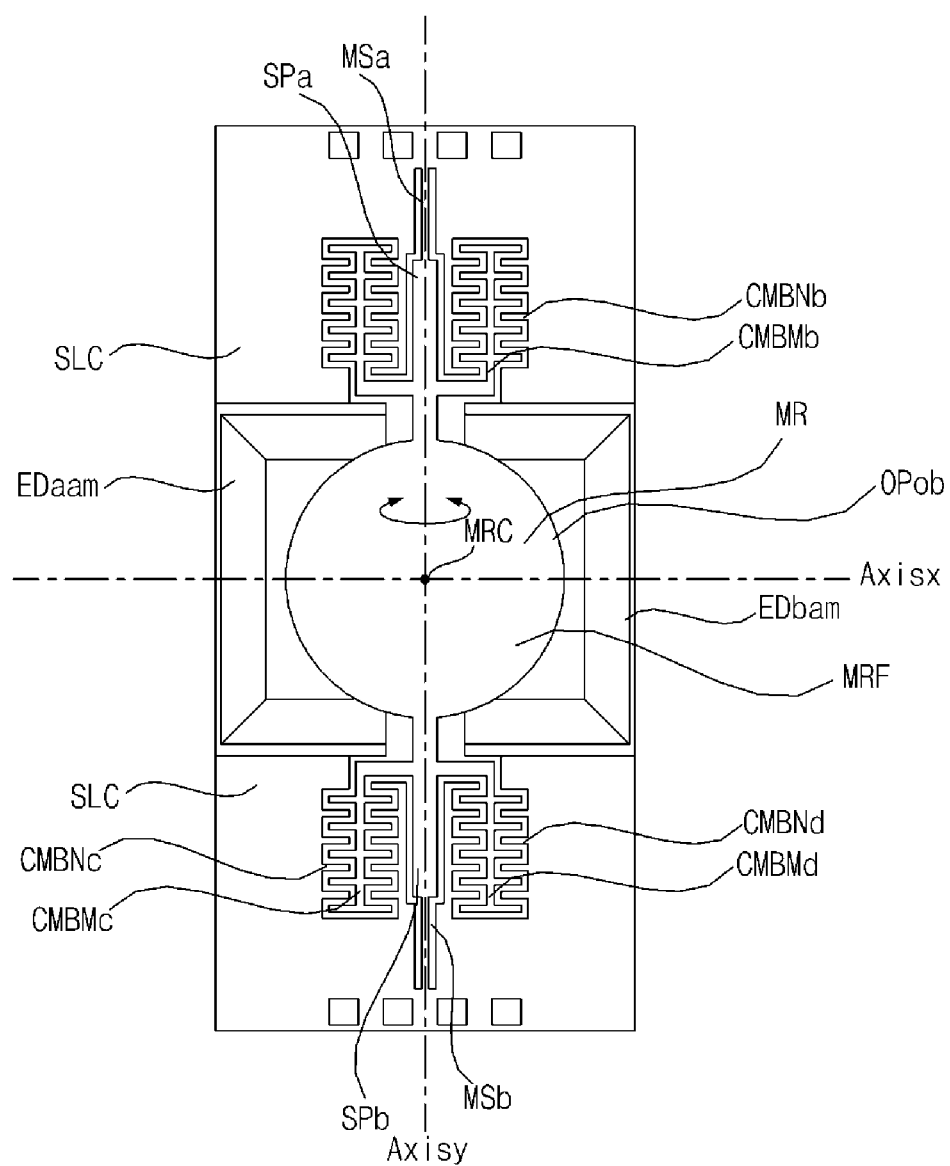

FIGS. 12A and 12B illustrate the front and rear views of a scanner 410f according to still further another embodiment of the present disclosure.

Similarly to FIGS. 3A and 3B, the scanner 410f includes a mirror MR rotating about a first axis Axisy based on the direct drive mechanism; a first and a second mirror supporting member SPa, SPb connected respectively to a first and a second side of the mirror MR; a first and a second mirror spring MSa, MSb connected respectively to the first and second mirror supporting members SPa, SPb; a plurality of combs CMBMa to CMBMd, CMBNa to CMBNd supplying a rotational force based on electrostatic force to the mirror MR; and a substrate SLC separated from the outside of the mirror.

The substrate SLC may be placed apart from the mirror MR and formed in a rectangular shape on the outside around the mirror MR.

Among the plurality of combs, the first comb CMBMa to CMBMd may be movable and, by being connected to the first or second mirror supporting member SPa or SPb, transfer a rotational force based on electrostatic force to the mirror MR.

Meanwhile, among the plurality of combs, the second comb CMBNa to CMBNd may be a fixed-type comb formed on the substrate SLC and disposed in correspondence with the first comb CMBMa to CMBMd.

A rotational force is generated by the electrostatic force between the first com CMBMa to CMBMd and the second comb CMBNa to CMBNd, and the generated rotational force may be transferred to the mirror MR.

Meanwhile, the figure assumes that, along the first axis direction Axisy, the first and second mirror support members SPa and SPb are connected to the first side and the second side of the mirror MR, and the first and second mirror springs MSa and MSb are connected respectively to the first and second mirror supporting members SPa and SPb; however, it should be noted that various modifications of the above configuration are possible.

For example, the scanner 410f may further include a third and a fourth mirror spring (not shown) connected to the first and second mirror supporting members SPa and SPb and to extend symmetrically in the second axial direction. Accordingly, the stress exerted on the first and second mirror springs MSa and MSb may be reduced by the third and fourth mirror springs (not shown).

Meanwhile, steps EDba and EDaa may be formed in the first and second areas, which occupy a portion of the substrate SLC and which form both areas of the mirror MR.

Meanwhile, even though the step's shape is different from that of FIG. 3A, to reduce the width of the substrate SLC, the present disclosure forms a first edge GBED and a second edge EGd, which is closer to the mirror MR than the first edge GBED and disposed at a lower position than the first edge GBED, on the substrate SLC.

In particular, it is preferable to set the optical interference angle to be larger at the second edge EGd than at the first edge GBED. Accordingly, light may be output to both directions of the mirror, thereby enabling wide-angle scanning. Also, element size may be reduced while reducing optical interference.

FIG. 12C illustrates various shapes of a substrate SLC of the scanner 410f of FIG. 12A or 12B.

Referring to the figure, FIGS. 12C(a) to (h) illustrate that a first GBED and a second edge EGd are connected with a partial slope, with a full slope, or at the right angle. Accordingly, various shapes may be implemented through etching.

Figure 13:
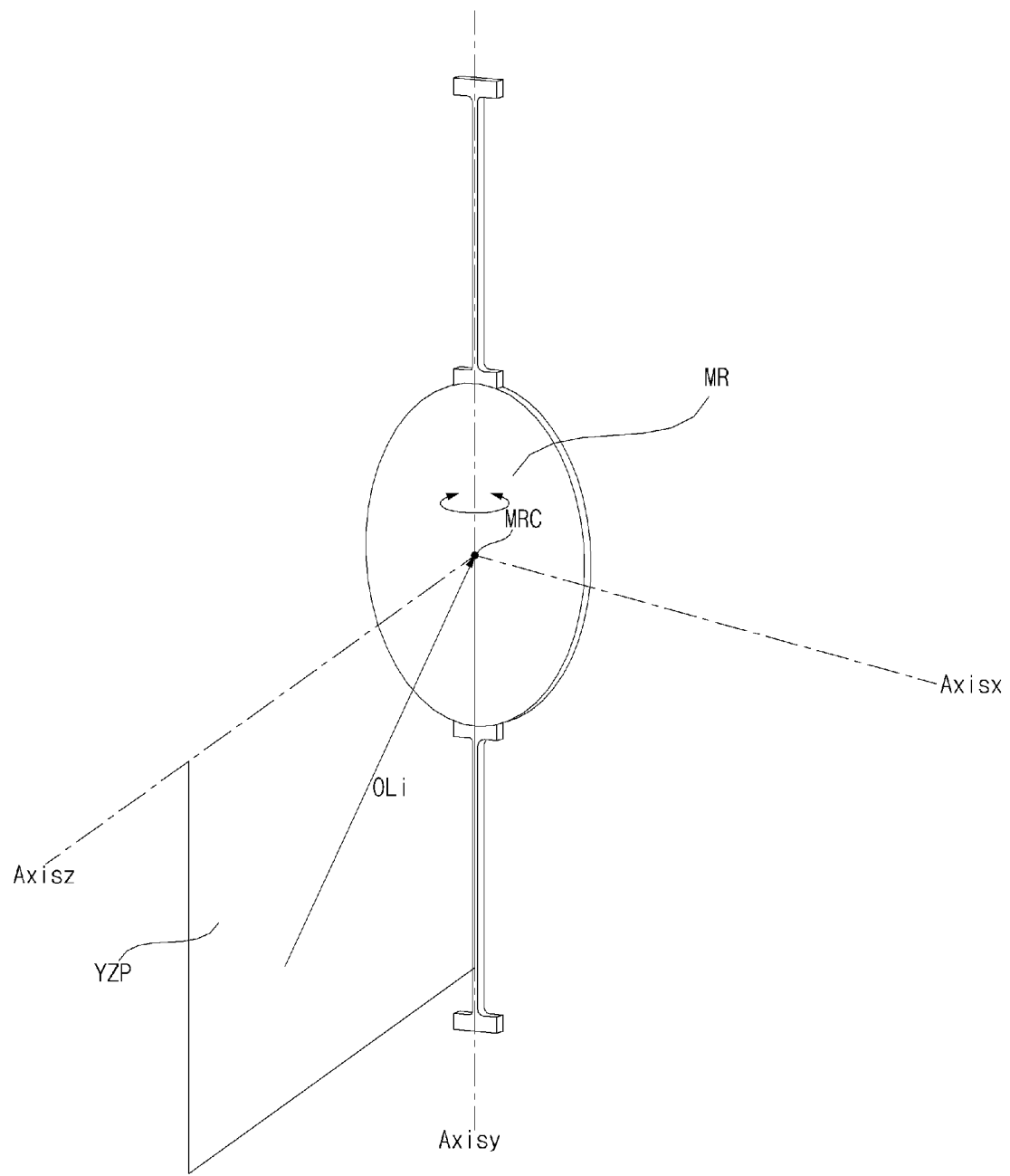
FIG. 13 illustrates light incident on a mirror.

FIG. 13 illustrates light incident on a mirror.

Referring to the figure, to implement a wide-angle scanner, the present disclosure uses a normal incidence method instead of the horizontal incidence method.

The normal incidence method is a method in which light OLi is incident along the third axis Axisz or at a predetermined angle relative to the third axis Axisz on the plane YZP formed by the first axis Axisy and the third axis Axisz.

According to the normal incidence method, light OLi is incident toward the mirror along or in the vicinity of the third axis Axisz, and reflected light is output in both left and right directions with respect to the center MRC of the mirror. In particular, reflected light may be output symmetrically in both left and right directions. Accordingly, wide-angle scanning may be implemented.

Throughout the document, preferred embodiments of the present disclosure have been described with reference to appended drawings; however, the present disclosure is not limited to the descriptions given above. Rather, it should be noted that various modifications of the present disclosure may be made by those skilled in the art to which the present disclosure belongs without departing from the technical spirit and scope of the present disclosure defined by the appended claims, and these modifications should not be understood individually from the technical principles or perspectives of the present disclosure.

What is claimed is:

1. A scanner, comprising:
a mirror to rotate around a first axis based on a direct drive mechanism;
a substrate separated from the outside of the mirror;
a first and a second mirror support member connected respectively to a first side and a second side of the mirror;
a first and a second mirror spring connected respectively to the first and second mirror support members; and
a plurality of combs formed on the substrate and to supply a rotational force based on electrostatic force to the mirror,
wherein the substrate includes a first edge and a second edge closer to the mirror than the first edge and placed at a lower position than the first edge, the optical interference angle at the second edge is greater than the optical interference angle at the first edge,
wherein magnitude of a rotation angle relative to the second axis intersecting the first axis ranges from 25 degrees to 40 degrees in response to the mirror rotating around the first axis.

2. The scanner of claim 1, wherein a step is formed at the first edge with respect to an upper surface of the mirror.

3. The scanner of claim 1, wherein, in response to the mirror rotating around the first axis, magnitude of a rotation angle relative to the second axis intersecting the first axis being 40 degrees, and the radius of the mirror being R, distance between the center of the mirror and the first edge is smaller than 4.41R.

4. The scanner of claim 1, wherein the first and second edges are connected with a partial slope, with a full slope, or at the right angle.

5. The scanner of claim 1, wherein a step is formed at the first edge with respect to the upper surface of the mirror, and
wherein in response to magnitude of a rotation angle relative to the second axis being θ, the thickness of the mirror being H, the radius of the mirror being R, and the mirror rotating around the first axis, the height of the step formed at the first edge corresponds to R×sin(θ)+H×cos(θ).

6. The scanner of claim 1, wherein a step is formed at the first edge with respect to the upper surface of the mirror, and
wherein in response to the thickness of the mirror being H, the radius of the mirror being R, and the mirror rotating around the first axis, the height of the step formed at the first edge is 0.42R+0.9H to 0.64R+0.76H.

7. The scanner of claim 1, wherein, in the plane formed by the first axis and a third axis orthogonal to the first and second axes, light is incident on the mirror along the third axis or at a predetermined angle relative to the third axis, and the light is reflected in a direction related to a first area and a second area.

8. The scanner of claim 1, further comprising a third and a fourth mirror spring connected respectively to the first and second mirror supporting members and to extend symmetrically in the direction of the second axis intersecting the first axis.

9. A scanner, comprising:
a mirror to rotate around a first axis based on a direct drive mechanism;
an upper substrate separated from the outside of the mirror;
a first and a second mirror support member connected respectively to a first side and a second side of the mirror;
a first and a second mirror spring connected respectively to the first and second mirror support members;
a plurality of combs formed on an upper substrate and to supply a rotational force based on electrostatic force to the mirror; and
a lower substrate disposed in a lower part of the upper substrate,
wherein the upper substrate includes a first edge and a second edge closer to the mirror than the first edge and placed at a lower position than the first edge, the optical interference angle at the second edge is greater than the optical interference angle at the first edge,
wherein magnitude of a rotation angle relative to the second axis intersecting the first axis ranges from 25 degrees to 40 degrees in response to the mirror rotating around the first axis.

10. The scanner of claim 9, wherein, in response to the mirror rotating around the first axis, magnitude of a rotation angle relative to the second axis intersecting the first axis being 40 degrees, and the radius of the mirror being R, distance between the center of the mirror and the first edge is smaller than 4.41R.

11. The scanner of claim 9, wherein the first and second edges are connected with a partial slope, with a full slope, or at the right angle.

12. The scanner of claim 9, wherein a step is formed at the first edge with respect to the upper surface of the mirror, and
wherein in response to magnitude of a rotation angle relative to the second axis being $\theta$, the thickness of the mirror being H, the radius of the mirror being R, and the mirror rotating around the first axis, the height of the step formed at the first edge corresponds to $R \times \sin(\theta) + H \times \cos(\theta)$.

13. The scanner of claim 9, wherein a step is formed at the first edge with respect to the upper surface of the mirror, and
wherein in response to the thickness of the mirror being H, the radius of the mirror being R, and the mirror rotating around the first axis, the height of the step formed at the first edge is 0.42R+0.9H to 0.64R+0.76H.

14. The scanner of claim 9, further comprising a third and a fourth mirror spring connected respectively to the first and second mirror supporting members and to extend symmetrically in the direction of the second axis intersecting the first axis.

15. An electronic apparatus comprising a scanner wherein the scanner comprises:
a mirror to rotate around a first axis based on a direct drive mechanism;
a substrate separated from the outside of the mirror;
a first and a second mirror support member connected respectively to a first side and a second side of the mirror;
a first and a second mirror spring connected respectively to the first and second mirror support members; and
a plurality of combs formed on the substrate and to supply a rotational force based on electrostatic force to the mirror,
wherein the substrate includes a first edge and a second edge closer to the mirror than the first edge and placed at a lower position than the first edge, the optical interference angle at the second edge is greater than the optical interference angle at the first edge,
wherein magnitude of a rotation angle relative to the second axis intersecting the first axis ranges from 25 degrees to 40 degrees in response to the mirror rotating around the first axis.

16. The electronic apparatus of claim 15, wherein, in response to the mirror rotating around the first axis, magnitude of a rotation angle relative to the second axis intersecting the first axis being 40 degrees, and the radius of the mirror being R, distance between the center of the mirror and the first edge is smaller than 4.41R.

17. The electronic apparatus of claim 15, wherein a step is formed at the first edge with respect to the upper surface of the mirror, and
wherein in response to magnitude of a rotation angle relative to the second axis being $\theta$, the thickness of the mirror being H, the radius of the mirror being R, and the mirror rotating around the first axis, the height of the step formed at the first edge corresponds to $R \times \sin(\theta) + H \times \cos(\theta)$.

18. The electronic apparatus of claim 15, wherein a step is formed at the first edge with respect to the upper surface of the mirror, and wherein in response to the thickness of the mirror being H, the radius of the mirror being R, and the mirror rotating around the first axis, the height of the step formed at the first edge is 0.42R+0.9H to 0.64R+0.76H.

* * * * *